(12) United States Patent
Hazzard et al.

(10) Patent No.: US 10,088,852 B2
(45) Date of Patent: Oct. 2, 2018

(54) MULTI-TANK WATER HEATER SYSTEMS

(71) Applicant: Honeywell International Inc., Morris Plains, NJ (US)

(72) Inventors: Fritz Hazzard, Plymouth, MN (US); David Heil, Robbinsdale, MN (US); James Holmberg, Champlin, MN (US); Gregory Young, Richfield, MN (US); Donald J. Kasprzyk, Maple Grove, MN (US); Bruce L. Hill, Roseville, MN (US)

(73) Assignee: Honeywell International Inc., Morris Plains, NJ (US)

( * ) Notice: Subject to any disclaimer, the term of this patent is extended or adjusted under 35 U.S.C. 154(b) by 44 days.

(21) Appl. No.: 15/166,110

(22) Filed: May 26, 2016

(65) Prior Publication Data

US 2016/0342163 A1     Nov. 24, 2016

Related U.S. Application Data

(63) Continuation of application No. 13/747,943, filed on Jan. 23, 2013.

(51) Int. Cl.
*F16L 43/00* (2006.01)
*G05D 23/185* (2006.01)
(Continued)

(52) U.S. Cl.
CPC .......... *G05D 23/1858* (2013.01); *F24H 1/18* (2013.01); *F24H 1/185* (2013.01); *F24H 1/186* (2013.01); *F24H 9/124* (2013.01); *F24H 9/14* (2013.01); *F24H 9/2007* (2013.01); *F24H 9/2021* (2013.01); *F24H 9/2035* (2013.01); *G05D 23/1393* (2013.01); *F28D 2020/0082* (2013.01); *Y10T 137/0329* (2015.04)

(58) Field of Classification Search
CPC . F24H 1/18; F24H 9/14; F24H 9/2007; F24H 9/2021; F28D 2020/0082; G05D 23/1858; Y10T 137/0329
USPC ................................................ 236/12; 137/3
See application file for complete search history.

(56) References Cited

U.S. PATENT DOCUMENTS

| 2,331,718 A | 10/1943 | Newton |
| 2,920,126 A | 1/1960 | Hajny |

(Continued)

FOREIGN PATENT DOCUMENTS

| CA | 2158120 | 3/1997 |
| CN | 201772614 | 3/2011 |

(Continued)

OTHER PUBLICATIONS

"Techno Mix" bulletin, "Installation—Series and Parallel", dated Jun. 8, 2012.*

(Continued)

*Primary Examiner* — Henry Crenshaw
(74) *Attorney, Agent, or Firm* — Seager Tufte & Wickhem LLP

(57) ABSTRACT

A water heater system including two or more water storage tanks plumbed in series, parallel or a combination thereof and methods of controlling said water heater systems. The water heater systems may include one or more mixing valves and one or more temperature sensors for providing water at a desired temperature.

20 Claims, 11 Drawing Sheets

(51) Int. Cl.
  *F24H 9/20* (2006.01)
  *G05D 23/13* (2006.01)
  *F24H 1/18* (2006.01)
  *F24H 9/12* (2006.01)
  *F24H 9/14* (2006.01)
  *F28D 20/00* (2006.01)

(56) References Cited

U.S. PATENT DOCUMENTS

| | | |
|---|---|---|
| 3,272,432 A | 9/1966 | Davidson |
| 3,759,279 A | 9/1973 | Smith, Jr. |
| 3,833,428 A | 9/1974 | Snyder et al. |
| 3,847,350 A | 11/1974 | Thompson |
| 3,849,350 A | 11/1974 | Matsko |
| 3,909,816 A | 9/1975 | Teeters |
| 3,948,439 A | 4/1976 | Heeger |
| 4,127,380 A | 11/1978 | Straitz, III |
| 4,131,413 A | 12/1978 | Ryno |
| 4,221,557 A | 9/1980 | Jalics |
| 4,305,547 A | 12/1981 | Cohen |
| 4,324,207 A | 4/1982 | Leuthard |
| 4,324,944 A | 4/1982 | Weihrich et al. |
| RE30,936 E | 5/1982 | Kmetz et al. |
| 4,333,002 A | 6/1982 | Kozak |
| 4,421,062 A | 12/1983 | Padilla, Sr. |
| 4,438,728 A | 3/1984 | Fracaro |
| 4,467,178 A | 8/1984 | Swindle |
| 4,483,672 A | 11/1984 | Wallace et al. |
| 4,507,938 A | 4/1985 | Hama et al. |
| 4,508,261 A | 4/1985 | Blank |
| 4,511,790 A | 4/1985 | Kozak |
| 4,568,821 A | 2/1986 | Boe |
| 4,588,875 A | 5/1986 | Kozak et al. |
| 4,638,789 A | 1/1987 | Ueki et al. |
| 4,655,705 A | 4/1987 | Shute et al. |
| 4,692,598 A | 9/1987 | Yoshida et al. |
| 4,696,639 A | 9/1987 | Bohan, Jr. |
| 4,734,658 A | 3/1988 | Bohan, Jr. |
| 4,742,210 A | 5/1988 | Tsuchiyama et al. |
| 4,770,629 A | 9/1988 | Bohan, Jr. |
| 4,778,378 A | 10/1988 | Dolnick et al. |
| 4,830,601 A | 5/1989 | Dahlander et al. |
| 4,834,284 A | 5/1989 | Vandermeyden |
| 4,906,337 A | 3/1990 | Palmer |
| 4,965,232 A | 10/1990 | Mauleon et al. |
| 4,977,885 A | 12/1990 | Herweyer et al. |
| 4,984,981 A | 1/1991 | Pottebaum |
| 4,986,468 A | 1/1991 | Deisinger |
| 5,007,156 A | 4/1991 | Hurtgen |
| 5,037,291 A | 8/1991 | Clark |
| 5,077,550 A | 12/1991 | Cormier |
| 5,103,078 A | 4/1992 | Boykin et al. |
| 5,112,217 A | 5/1992 | Ripka et al. |
| 5,125,068 A | 6/1992 | McNair et al. |
| 5,126,721 A | 6/1992 | Butcher et al. |
| 5,222,888 A | 6/1993 | Jones et al. |
| 5,232,582 A | 8/1993 | Takahashi et al. |
| 5,236,328 A | 8/1993 | Tate et al. |
| 5,280,802 A | 1/1994 | Comuzie, Jr. |
| 5,317,670 A | 5/1994 | Elia |
| 5,391,074 A | 2/1995 | Meeker |
| 5,424,554 A | 6/1995 | Marran et al. |
| 5,442,157 A | 8/1995 | Jackson |
| 5,567,143 A | 10/1996 | Servidio |
| 5,622,200 A | 4/1997 | Schulze |
| 5,660,328 A | 8/1997 | Momber |
| 5,779,143 A | 7/1998 | Michaud et al. |
| 5,791,890 A | 8/1998 | Maughan |
| 5,797,358 A | 8/1998 | Brandt et al. |
| 5,857,845 A | 1/1999 | Paciorek |
| 5,896,089 A | 4/1999 | Bowles |
| 5,968,393 A | 10/1999 | Demaline |
| 5,971,745 A | 10/1999 | Bassett et al. |
| 5,975,884 A | 11/1999 | Dugger |
| 6,053,130 A | 4/2000 | Shellenberger |
| 6,059,195 A | 5/2000 | Adams et al. |
| 6,069,998 A | 5/2000 | Barnes et al. |
| 6,075,923 A | 6/2000 | Wu |
| 6,080,971 A | 6/2000 | Seitz et al. |
| 6,208,806 B1 | 3/2001 | Langford |
| 6,212,894 B1 | 4/2001 | Brown et al. |
| 6,236,321 B1 | 5/2001 | Troost, IV |
| 6,261,087 B1 | 7/2001 | Bird et al. |
| 6,271,505 B1 | 8/2001 | Henderson |
| 6,286,464 B1 | 9/2001 | Abraham et al. |
| 6,293,471 B1 | 9/2001 | Stettin et al. |
| 6,299,433 B1 | 10/2001 | Gauba et al. |
| 6,350,967 B1 | 2/2002 | Scott |
| 6,351,603 B2 | 2/2002 | Waithe et al. |
| 6,363,218 B1 | 3/2002 | Lowenstein et al. |
| 6,371,057 B1 | 4/2002 | Henderson |
| 6,375,087 B1 | 4/2002 | Day et al. |
| 6,390,029 B2 | 5/2002 | Alphs |
| RE37,745 E | 6/2002 | Brandt et al. |
| 6,410,842 B1 | 6/2002 | McAlonan |
| 6,455,820 B2 | 9/2002 | Bradenbaugh |
| 6,553,946 B1 | 4/2003 | Abraham et al. |
| 6,560,409 B2 | 5/2003 | Troost, IV |
| 6,606,968 B2 | 8/2003 | Iwamam et al. |
| 6,629,021 B2 | 9/2003 | Cline et al. |
| 6,631,622 B1 | 10/2003 | Ghent et al. |
| 6,633,726 B2 | 10/2003 | Bradenbaugh |
| 6,684,821 B2 | 2/2004 | Lannes et al. |
| 6,701,874 B1 | 3/2004 | Schultz et al. |
| 6,732,677 B2 | 5/2004 | Donnelly et al. |
| 6,794,771 B2 | 9/2004 | Orloff |
| 6,795,644 B2 | 9/2004 | Bradenbaugh |
| 6,835,307 B2 * | 12/2004 | Talbert .............. C02F 9/005 165/200 |
| 6,845,110 B2 | 1/2005 | Gibson |
| 6,861,621 B2 | 3/2005 | Ghent |
| 6,880,493 B2 | 4/2005 | Clifford |
| 6,920,377 B2 | 7/2005 | Chian |
| 6,934,862 B2 | 8/2005 | Sharood et al. |
| 6,936,798 B2 | 8/2005 | Moreno |
| 6,955,301 B2 | 10/2005 | Munsterhuis et al. |
| 6,959,876 B2 | 11/2005 | Chian et al. |
| 6,967,565 B2 | 11/2005 | Lingemann |
| 6,973,819 B2 | 12/2005 | Ruhland et al. |
| 6,995,301 B1 | 2/2006 | Shorrosh |
| 7,032,542 B2 | 4/2006 | Donnelly et al. |
| 7,065,431 B2 | 6/2006 | Patterson et al. |
| 7,076,373 B1 | 7/2006 | Munsterhuis, V et al. |
| 7,088,238 B2 | 8/2006 | Karaoguz et al. |
| 7,103,272 B2 | 9/2006 | Baxter |
| 7,117,825 B2 | 10/2006 | Phillips |
| 7,137,373 B2 | 11/2006 | Seymour, II et al. |
| 7,162,150 B1 | 1/2007 | Welch et al. |
| 7,167,813 B2 | 1/2007 | Chian et al. |
| 7,221,862 B1 | 5/2007 | Miller et al. |
| 7,252,502 B2 | 8/2007 | Munsterhuis |
| 7,255,285 B2 | 8/2007 | Troost et al. |
| 7,298,968 B1 | 11/2007 | Boros et al. |
| 7,317,265 B2 | 1/2008 | Chian et al. |
| 7,346,274 B2 | 3/2008 | Bradenbaugh |
| 7,373,080 B2 | 5/2008 | Baxter |
| 7,380,522 B2 | 6/2008 | Krell et al. |
| 7,432,477 B2 | 10/2008 | Teti |
| 7,434,544 B2 | 10/2008 | Donnelly et al. |
| 7,469,550 B2 | 12/2008 | Chapman, Jr. et al. |
| 7,506,617 B2 | 3/2009 | Paine et al. |
| 7,526,539 B1 | 4/2009 | Hsu |
| 7,561,057 B2 | 7/2009 | Kates |
| 7,603,204 B2 | 10/2009 | Patterson et al. |
| 7,613,855 B2 | 11/2009 | Phillips et al. |
| 7,623,771 B2 | 11/2009 | Lentz et al. |
| 7,634,976 B2 | 12/2009 | Gordon et al. |
| 7,672,751 B2 | 3/2010 | Patterson et al. |
| 7,712,677 B1 | 5/2010 | Munsterhuis, V et al. |
| 7,744,007 B2 | 6/2010 | Beagen et al. |
| 7,744,008 B2 | 6/2010 | Chapman, Jr. et al. |
| 7,770,807 B2 | 8/2010 | Robinson |
| 7,798,107 B2 | 9/2010 | Chian et al. |
| 7,804,047 B2 | 9/2010 | Zak et al. |

(56) References Cited

U.S. PATENT DOCUMENTS

| | | | |
|---|---|---|---|
| 7,902,959 B2 | 3/2011 | Yamada et al. | |
| 7,932,480 B2 | 4/2011 | Gu et al. | |
| 7,934,662 B1 | 5/2011 | Jenkins | |
| 7,970,494 B2 | 6/2011 | Fima | |
| 7,974,527 B1 | 7/2011 | Adler | |
| 8,061,308 B2 | 11/2011 | Phillips | |
| 8,074,894 B2 | 12/2011 | Beagen | |
| 8,083,104 B2 | 12/2011 | Roetker et al. | |
| 8,111,980 B2 | 2/2012 | Bradenbaugh | |
| 8,165,726 B2 | 4/2012 | Nordberg et al. | |
| 8,204,633 B2 | 6/2012 | Harbin, III et al. | |
| 8,245,987 B2 | 8/2012 | Hazzard et al. | |
| 8,322,312 B2 | 12/2012 | Strand | |
| 8,360,334 B2 | 1/2013 | Nold et al. | |
| 8,367,984 B2 | 2/2013 | Besore | |
| 8,422,870 B2 | 4/2013 | Nelson et al. | |
| 8,498,527 B2 | 7/2013 | Roetker et al. | |
| 8,600,556 B2 | 12/2013 | Nesler et al. | |
| 8,606,092 B2 | 12/2013 | Amiran et al. | |
| 8,660,701 B2 | 2/2014 | Phillips et al. | |
| 8,667,112 B2 | 3/2014 | Roth et al. | |
| 8,726,789 B2 | 5/2014 | Clark | |
| 8,770,152 B2 | 7/2014 | Leeland et al. | |
| 9,080,769 B2 | 7/2015 | Bronson et al. | |
| 9,122,283 B2 | 9/2015 | Rylski et al. | |
| 9,195,242 B2 | 11/2015 | Zobrist et al. | |
| 9,228,746 B2 | 1/2016 | Hughes et al. | |
| 9,249,986 B2 | 2/2016 | Hazzard et al. | |
| 9,310,098 B2 | 4/2016 | Buescher et al. | |
| 2002/0099474 A1 | 7/2002 | Khesin | |
| 2003/0093186 A1 | 5/2003 | Patterson et al. | |
| 2004/0042772 A1 | 3/2004 | Whitford et al. | |
| 2004/0079749 A1 | 4/2004 | Young et al. | |
| 2006/0027571 A1 | 2/2006 | Miyoshi et al. | |
| 2006/0272830 A1 | 12/2006 | Fima | |
| 2007/0023333 A1 | 2/2007 | Mouhebaty et al. | |
| 2007/0084419 A1* | 4/2007 | Krell | F24H 9/2021 122/13.01 |
| 2007/0210177 A1 | 9/2007 | Karasek | |
| 2007/0228181 A1* | 10/2007 | Robinson | D06F 39/08 236/12.11 |
| 2007/0292810 A1 | 12/2007 | Maiello et al. | |
| 2008/0003530 A1 | 1/2008 | Donnelly et al. | |
| 2008/0023564 A1 | 1/2008 | Hall | |
| 2008/0048046 A1 | 2/2008 | Wagner et al. | |
| 2008/0188995 A1 | 8/2008 | Hotton et al. | |
| 2008/0197206 A1 | 8/2008 | Murakami et al. | |
| 2009/0117503 A1 | 5/2009 | Cain | |
| 2010/0065764 A1* | 3/2010 | Canpolat | E03C 1/057 251/129.04 |
| 2010/0116224 A1 | 5/2010 | Leeland et al. | |
| 2010/0163016 A1 | 7/2010 | Pan | |
| 2010/0235004 A1* | 9/2010 | Thind | G05B 15/02 700/277 |
| 2011/0254661 A1 | 10/2011 | Fawcett et al. | |
| 2011/0259322 A1 | 10/2011 | Davis et al. | |
| 2011/0305444 A1 | 12/2011 | Pussell | |
| 2012/0024968 A1 | 2/2012 | Beyerle et al. | |
| 2012/0060771 A1 | 3/2012 | Brian et al. | |
| 2012/0060829 A1 | 3/2012 | DuPlessis et al. | |
| 2013/0104814 A1 | 5/2013 | Reyman | |
| 2014/0060457 A1* | 3/2014 | Hill | G05D 23/19 122/14.1 |
| 2014/0202549 A1* | 7/2014 | Hazzard | F24H 9/2007 137/3 |
| 2014/0203093 A1* | 7/2014 | Young | F24D 19/1066 237/8 A |
| 2014/0212821 A1 | 7/2014 | Banu et al. | |
| 2015/0083384 A1 | 3/2015 | Lewis, Jr. et al. | |
| 2015/0120067 A1 | 4/2015 | Wing et al. | |
| 2015/0276268 A1 | 10/2015 | Hazzard et al. | |
| 2015/0277463 A1 | 10/2015 | Hazzard et al. | |
| 2015/0354833 A1 | 12/2015 | Kreutzman | |
| 2016/0146505 A1* | 5/2016 | Hill | F24H 9/2021 392/498 |

FOREIGN PATENT DOCUMENTS

| | | |
|---|---|---|
| CN | 201909441 | 7/2011 |
| CN | 102213489 | 10/2011 |
| CN | 203203717 | 9/2013 |
| EP | 0356609 | 3/1990 |
| EP | 0531072 | 3/1993 |
| EP | 0699316 | 7/1999 |
| EP | 0967440 A2 | 12/1999 |
| EP | 1148298 B1 | 10/2004 |
| EP | 1621814 | 2/2006 |
| EP | 1178748 | 10/2006 |
| EP | 2108140 | 6/2012 |
| FR | 2820206 | 8/2002 |
| GB | 2211331 | 6/1999 |
| JP | H 08264469 | 10/1996 |
| JP | 2005283039 | 10/2005 |
| JP | 2006084322 | 3/2006 |
| JP | 2008008548 | 1/2008 |
| JP | 2011-220560 * | 11/2011 |
| JP | 2011220560 | 11/2011 |
| JP | 2005-283039 * | 10/2015 |
| TW | 1431223 | 3/2014 |
| WO | 9718417 A1 | 5/1997 |
| WO | WO 2008102263 | 8/2008 |
| WO | WO 2009022226 | 2/2009 |
| WO | WO 2009/061622 | 5/2009 |
| WO | WO 2011104592 | 9/2011 |

OTHER PUBLICATIONS

"Plumbing Inspections," 10 pages, printed Oct. 1, 2012. http://nachi.org/forum/f22/dual-water-heater-installations-36034/.

"Results and Methodology of the Engineering Analysis for Residential Water Heater Efficiency Standards," 101 pages, Oct. 1998.

Heat Transfer Products Inc., "Specification for Heat Transfer Products, Inc." 2 pages, Revised Mar. 17, 2006.

Hiller, "Dual-Tank Water Heating System Options," ASHRAE Transactions, p. 1028-1037, Downloaded Nov. 16, 2012.

InspectAPedia®, "Guide to Alternative Hot Water Sources," 6 pages, printed Oct. 1, 2012.

Raychem, "HWAT-ECO," Tyco Thermal Control, 4 pages, © 2012.

Techno Mix, "Installation-Series and Parallel," 5 pages, Printed Oct. 1, 2012. www.chinawinds.co.uk/diy_tips/installation_series_and_parallel.html.

Triangle Tube, "Condensing High Efficiency Gas Boiler," 4 pages, Revised Apr. 30, 2012.

AO Smith, "IComm Remote Monitoring Systems, Instruction Manual," 64 pages, Jun. 2009.

U.S. Appl. No. 14/689,896, filed Apr. 17, 2015.
U.S. Appl. No. 14/964,392, filed Dec. 9, 2015.
U.S. Appl. No. 15/061,520, filed Mar. 4, 2016.

Filibeli et al., "Embedded Web Server-Based Home Appliance Networks," Journal of Network and Computer Applications, vol. 30, pp. 499-514, 2007.

Halfbakery.com, "Hot Water Alarm," 2 pages, Sep. 4, 2002.

Honeywell International Inc., "CS8800 General Assembly, Drawing No. 50000855," 2 pages, Oct. 24, 2008.

Honeywell International Inc., "Thermopile Assembly, Drawing No. 50006821," 1 page, Jun. 18, 2010.

Honeywell International Inc., "Thermopile Element, Drawing No. 50010166," 1 page, Apr. 1, 2005.

Honeywell International Inc., "Thermopile General Assembly, Drawing No. 50006914," 1 page, Jan. 12, 2006.

Honeywell International Inc., Photograph of a CS8800 Thermocouple Assembly, 1 page, saved Oct. 9, 2014.

http://www.whirlpoolwaterheaters.com/learn_more/energysmartelectricwaterheateroperation.aspx, link no longer functions, "Energy Smart Electric Water Heater Operation," 3 pages, prior to Nov. 13, 2012.

(56) References Cited

OTHER PUBLICATIONS http://www.whirlpoolwaterheaters.com/learn-more/eletric-water-heaters/6th-sense%E2% . . . , "Whirlpool Energy Smart Electric Water Heater, Learn More," 3 pages, printed Jan. 15, 2015.

Industrial Controls, "Basics of PID Control (Proportional+Integral+Derivative)," downloaded from https://web.archive.org/web/20110206195004/http://wwww.industrialcontrolsonline.com/training/online/basics-pid-control-proportionalintegralderivative, 4 pages, Feb. 6, 2011.

Johnson Controls, "K Series BASO Thermocouples, Heating Line Product Guide 435.0, Thermocouples Section, Product Bulletin K Series," 8 pages, Oct. 1998.

Lennox "Network Control Panel, User's Manual," 18 pages, Nov. 1999.

Moog, "M3000 Control System, RTEMP 8, Remote 8-Channel Temperature Controller with CanOpen Interface," 6 pages, Nov. 2004.

Process Technology, "Troubleshooting Electric Immersion Heaters," downloaded from http://www.processtechnology.com/troubleshootheaters.html, 3 pages, Mar. 22, 2010.

Reliance Water Heaters, "Service Handbook for Standard Residential FVIR Gas Water Heaters, Models: G/LORT, G/LORS, G/LBRT, G/LBRS/ G/LBCT, G/LBCS, G/LKRT, G/LKRS, G/LKCT, G/LART, G/LARS, G/LXRT, GLQRT—Series 200/201 and Series 202/203," 44 pages, Nov. 2009.

\* cited by examiner

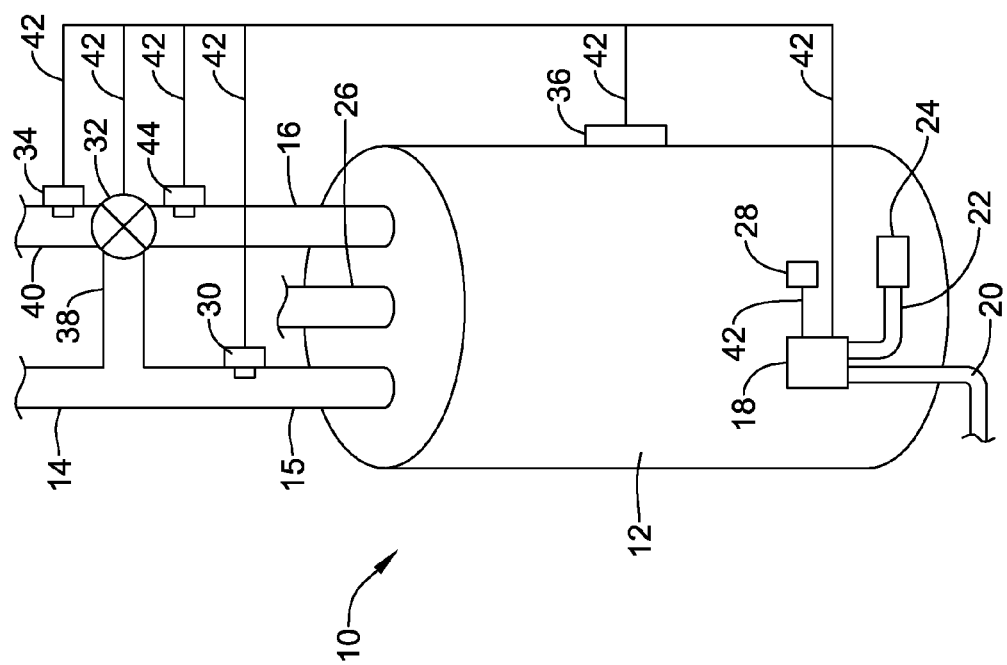

MULTI-TANK WATER HEATER SYSTEMS

This is a continuation application of co-pending U.S. patent application Ser. No. 13/747,943, filed Jan. 23, 2013 and entitled MULTI-TANK WATER HEATER SYSTEMS, which is incorporated herein by reference.

TECHNICAL FIELD

The disclosure relates generally to water heaters, and more particularly, to water heater systems that have multiple tanks and methods of controlling water heater systems having multiple tanks.

BACKGROUND

Water heaters are used in homes, businesses and in just about any establishment having the need for heated water. A conventional water heater typically has at least one heating element or "heater," such as a gas-fired burner and/or electric heating element. Each water heater also typically has at least one thermostat or controller for controlling the heater. The controller typically receives signals related to the temperature of the water within the water heater tank, often from a temperature sensor that is thermally engaged with the water in the water heater tank.

In some instances, a water heater may operate in accordance with a first temperature set point and a second temperature set point. The difference between the first and second temperature set point may be referred to as the temperature differential of the water heater. When temperature signals from the temperature sensor indicate that the water temperature is below the first set point, for example when the water temperature is below about 120° F., the controller may turn on the heater and the water within the water heater tank begins to heat. After some time, the water temperature within the water heater tank will increase to the second set point, which, for example may be about 140° F. At this point, the controller may cause the heater to reduce its heat output or, alternatively, causes the heater to turn off. This heat cycle begins again when the water temperature within the water heater tank cools down below the first set point.

For a gas fired water heater, a temperature sensor, a gas valve and a controller are often mounted relative to the water heater tank. The controller typically receives a temperature signal from the temperature sensor. The temperature sensor often protrudes into and is thermally coupled to the water in the water heater tank. The controller typically is programmed to control the gas valve such that the temperature of the water in the water heater tank remains between the first and second temperature set points, as described above. For an electric water heater, a temperature sensor, a power delivery unit and a controller may be mounted to the water heater tank. In this case, the controller may control the power delivery unit such that the temperature of the water in the water heater tank is kept between the first and second temperature set points.

Typically, a water heater is sized to service an expected peak hot water demand for a particular application. As such, for applications with higher peak hot water demands, the size of the water heater may need to become fairly large. Larger water heaters, however, can be less energy efficient than smaller water heaters. What would be desirable, therefore, is a water heater system that can satisfy fairly large hot water demands, but in a more energy efficient manner.

SUMMARY

The disclosure relates generally to water heaters, and more particularly, to water heater systems that have multiple tanks and methods of controlling water heater systems having multiple tanks. An illustrative but non-limiting example of the disclosure may be found in a water heater system that includes a first water storage tank having a first water inlet and a first water outlet and a second water storage tank having a second water inlet and a second water outlet. A water line may fluidly connect the first water outlet to the second water inlet for transporting water from the first water storage tank to the second water storage tank. The system may further include a mixing valve having a first inlet fluidly coupled to the second water outlet downstream of the second water storage tank and a cold water supply line in fluid communication with a second inlet of the mixing valve. A mixed water outlet may be fluidly coupled to an outlet of the mixing valve. The system may further include a controller in electrical communication with the mixing valve.

Another illustrative but non-limiting example of the disclosure may be found in a water heater system that includes a first water storage tank having a first water inlet and a first water outlet and a second water storage tank having a second water inlet and a second water outlet. A cold water supply line may be in fluid communication with the first water inlet and the second water inlet. A hot water line may be in fluid communication with the first water outlet and the second water outlet, wherein from the first water storage tank is mixed with water from the second water storage tank in the hot water line. The system may further include a mixing valve having a first inlet fluidly coupled to the hot water supply line and a second cold water supply line in fluid communication with a second inlet of the mixing valve. A mixed water outlet may be fluidly coupled to an outlet of the mixing valve. The system may further include a controller in electrical communication with the mixing valve.

Another illustrative but non-limiting example of the disclosure may be found in a water heater system that includes a first water storage tank having a first water inlet and a first water outlet and a second water storage tank having a second water inlet and a second water outlet. A cold water supply line may be in fluid communication with the first water inlet of the first water storage tank and the second water inlet of the second water storage tank. A first hot water supply line may be in fluid communication with the first water outlet of the first storage tank. A first mixing valve may be provided. The first mixing valve may have a first inlet fluidly coupled to the first hot water supply line and a second inlet coupled to the cold water supply line. The first mixing valve may be controllable via a first communications interface. A first mixed water outlet may be fluidly coupled to an outlet of the first mixing valve. A second hot water supply line may be in fluid communication with the second water outlet of the second storage tank. A second mixing valve may have a first inlet fluidly coupled to the second hot water supply line and a second inlet coupled to the first mixed water outlet of the first mixing valve. The second mixing valve being controllable via a second communications interface. A second mixed water outlet may be fluidly coupled to an outlet of the second mixing valve, The system may further include a controller for controlling the first mixing valve via the first communications interface and the second mixing valve via the second communications interface.

Another illustrative but non-limiting example of the disclosure may be found in a water heater system that includes a first water storage tank having a first water inlet and a first water outlet, and a second water storage tank having a second water inlet and a second water outlet. A cold water supply line may be in fluid communication with the first water inlet of the first water storage tank and the second water inlet of the second water storage tank. A first hot water supply line may be in fluid communication with the first water outlet of the first storage tank. A first mixing valve may have a first inlet fluidly coupled to the first hot water supply line and a second inlet coupled to the cold water supply line. The first mixing valve may be controllable via a first communications interface. A first mixed water outlet may be fluidly coupled to an outlet of the first mixing valve. A second hot water supply line may be in fluid communication with the second water outlet of the second storage tank. A second mixing valve may have a first inlet fluidly coupled to the second hot water supply line and a second inlet coupled to the cold water supply line. The second mixing valve may be controllable via a second communications interface. A second mixed water outlet may be fluidly coupled to an outlet of the second mixing valve. A third mixing valve may have a first inlet fluidly coupled to the first mixed water output of the first mixing valve and a second inlet coupled to the second mixed water output of the second mixing valve. The third mixing valve may be controllable via a third communications interface. A third mixed water outlet may be fluidly coupled to an outlet of the third mixing valve. The system may further include a controller for controlling the first mixing valve via the first communications interface, the second mixing valve via the second communications interface and the third mixing valve via the third communications interface.

Another illustrative but non-limiting example of the disclosure may be found in a water heater system that includes a cold water inlet line, a hot water outlet line, a first water heater having a first water inlet and a first water outlet, and a second water heater having a second water inlet and a second water outlet. Configurable plumbing may be coupled to the cold water inlet line, the hot water outlet line, the first water inlet, the first water outlet, the second water inlet and the second water outlet. The configurable plumbing may including one or more controllable valves that, when in a first state, plumb the first water heater and the second water heater in a series configuration between the cold water inlet line and the hot water outlet line, and when in a second state, plumb the first water heater and the second water heater in a parallel configuration between the cold water inlet line and the hot water outlet line. The system may further include a controller for selectively switching the one or more controllable valves between the first state and the second state.

Another illustrative but non-limiting example of the disclosure may be found in a method for controlling a water heater system having two or more water storage tanks. The illustrative method may include: drawing water from the water heater system; monitoring a first change in temperature of water in a first water storage tank; monitoring a second change in temperature of water in a second water storage tank; determining if the first change in temperature is different from the second change in temperature by at least a threshold amount; controlling a setpoint temperature of the first water storage tank and a setpoint temperature of the second water storage tank in accordance with a first control algorithm if the first change in temperature is different from the second change in temperature by at least the threshold amount; and controlling the setpoint temperature of the first water storage tank and the setpoint temperature of the second water storage tank in accordance with a second control algorithm that is different from the first control algorithm if the first change in temperature is not different from the second change in temperature by at least the threshold amount.

Another illustrative but non-limiting example of the disclosure may be found in a method for controlling a water heater system including two or more water heater tanks. The method may include the steps of establishing a relationship between hot water usage and a time of day, and adjusting the temperature setpoint of a first water heater tank based on the hot water usage for a given time period, and the temperature setpoint of a second water heater tank may be adjusted based on the hot water usage for the given time period.

BRIEF DESCRIPTION OF THE FIGURES

The following description should be read with reference to the drawings. The drawings, which are not necessarily to scale, depict examples and are not intended to limit the scope of the disclosure. The disclosure may be more completely understood in consideration of the following description of various examples in connection with the accompanying drawings, in which:

FIG. 1 is a schematic view of an illustrative but non-limiting water heater system;

Figure 2A:
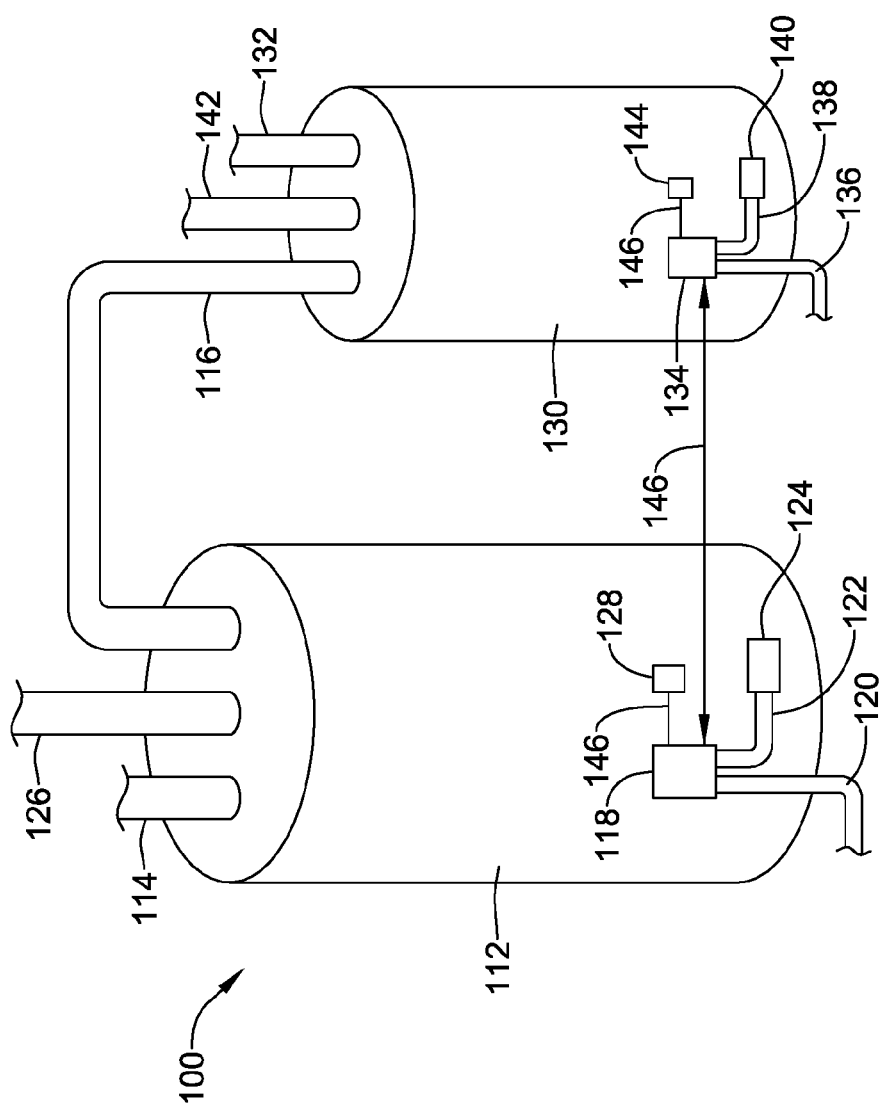
FIG. 2A is a schematic view of another illustrative but non-limiting water heater system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that and are not intended to limit the scope of the disclosure. Although examples of construction, dimensions, and materials are illustrated for the various elements, those skilled in the art will recognize that many of the examples provided have suitable alternatives that may be utilized.

FIG. 1 is a schematic view of an illustrative but non-limiting water heater system 10. Water heater system 10 includes a water tank 12. The water tank 12 may include an insulating layer (not explicitly shown) positioned about the water tank 12 to help reduce thermal losses from the water tank 12. Cold water enters water tank 12 through a cold water line 14 and is heated by a gas burner 24. In some cases, the water heater 10 may include an electric heating element rather than a gas burner 24. A power delivery unit (not shown) may be used to selectively apply power (i.e. current) to the electric heating element. For gas-fired water heaters, a control unit 18 may control a gas control unit, such as a gas valve, to regulate gas flow from a gas source 20 through a combustion gas line 22 and into gas burner 24. A flue 26 permits combustion byproducts to safely exit. In some instances, control unit 18 may also control additional components of the water heater system. Whether oil, gas or electric powered, the resulting heated water exits through a hot water line 16.

As can be seen, water heater 10 may include a temperature sensor 28 for monitoring the temperature of the water within the water tank 12. In some cases, temperature sensor 28 may enter water tank 12 at a location laterally offset from control unit 18. In some instances, however, temperature sensor 28 may be located behind control unit 18, and in some cases, may be supported and retained by a common mounting bracket. In any event, water tank 12 may include an aperture that is sized and configured to accept temperature sensor 28. The aperture may include threads that are configured to accommodate corresponding matching threads on temperature sensor 28. In some cases, temperature sensor 28 has a compression or frictional fit within the aperture. In other instances, water tank 12 may include a threaded spud (not explicitly shown) that is configured to receive temperature sensor 28.

In some instances, the water tank 12 may be smaller than a typical water heater tank (for example, in some instances, less than 60 gallons) for a given application, while still providing the heater water capacity of a larger tank. In some instances, the setpoint temperature of the water heater 10 may be set to a higher temperature than the temperature desired at the water outlet 40. The water heater 10 may include an electronically controlled mixing valve 32 for injecting a regulated amount of cold water into the hot water line 16 to achieve the desired temperature at the water outlet 40. The temperature of the hot water exiting the water tank 12 may be hotter than the desired outlet water 40 temperature, and thus the cold water may be used to temper, or cool, the hot water leaving the tank to achieve the desired outlet water temperature. In some instances, the cold water line 14 may include a branch line 38 that may be directly connected to the mixing valve 32 for injecting cold water into the mixing valve 32, while some cold water passes through cold water inlet 15 and into the water tank 12. In other instances, it is contemplated that a separate cold water line may be connected to the mixing valve 32. In order to achieve mass flow balance, the flow rate of cold water in cold water line 14 may equal the flow rate of water exiting water outlet 40. The flow rate of cold water entering the water tank 12 from the cold water inlet 15 may be approximately equal to the flow rate of hot water exiting the water tank 12 at the hot water line 16.

In some instances, water heater system 10 may be provided with a burner 24 that is oversized for the water tank 12 relative to a conventional water heater. This may allow the water heater system 10 to more quickly heat and maintain the water within the water tank 12 to a higher temperature than is desired at the water outlet 40, although this is not required. For example, if a water temperature of 110° F. is desired at the water outlet 40, the water within the water tank 12 may be maintained at a temperature of 135° F., although this is merely exemplary. It is contemplated that the water temperature exiting the water outlet 40 and the water temperature in the water tank 12 may be selected to be any value desired based on the desired application. The operating setpoint of the water temperature within the water tank 12 may be selected based on a number of variables, such as, but not limited to, the temperature of the cold water entering the water tank 12 and the mixing valve 32, the desired water temperature at the water outlet 40, the volume of the water tank 12, and/or the percent of usable hot water in the water tank 12, etc. It is further contemplated that the proportion of cold water entering mixing valve 32 from the branch line 38 to the hot water entering the mixing valve 32 from the hot water line 16 may be dependent upon a number of variables, such as, but not limited to, the temperature of the cold water entering the mixing valve 32, the temperature of the hot water entering the mixing valve 32, and/or the desired water temperature at the water outlet 40, etc.

The mixed water outlet 40 may include an outlet water temperature sensor 34 for measuring the temperature of the water exiting the water heater system 10. In some embodiments, a temperature sensor 44 may be provided in the hot water line 16 and a temperature sensor 30 may be provided in the cold water line 14 to help improve control of the water temperature exiting the water heater system 10 at the outlet line 40. It is contemplated that the mixing valve 32 and the outlet water temperature sensor 34 may be connected to the control unit 18 via a communication bus 42, or other alternative connection. For example, it is contemplated that the mixing valve 32 and temperature sensor 34 may be in wired or wireless communication with the control unit 18. Similarly, temperature sensors 28, 30, 44 may also be in communication with the control unit 18 via a communication bus 42 or other alternative connection, if present. It is contemplated that the temperature sensors 28, 30, 44 may be in wired or wireless communication with the control unit 18. The water heater 10 may include an optional Man-Machine Interface (MMI) or user interface 36. The user interface 36 may allow a user to view and/or modify temperature setpoints and other control features, as desired.

Figure 8:
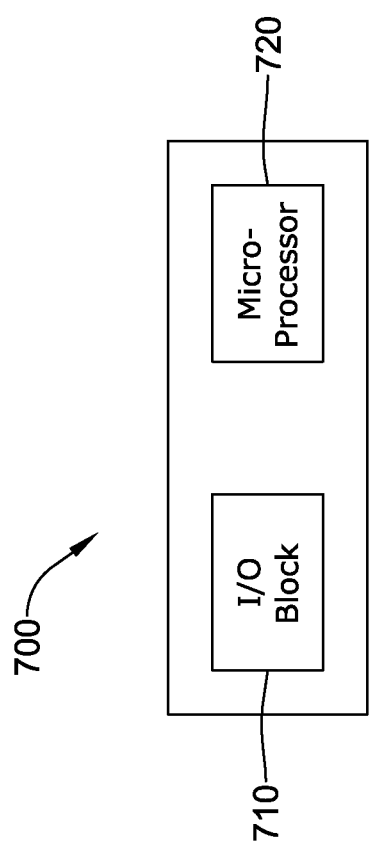
FIG. 8 is a schematic of an illustrative controller.

Referring briefly to FIG. 8, it will be appreciated that control unit 18 may include a controller. FIG. 8 is a block diagram of one such controller 700. The controller 700 may be considered as being a portion of control unit 18, or separate from control unit 18. Controller 700 may have several blocks. In some cases, controller 700 may have an INPUT/OUTPUT block 710 that accepts signals from the temperature sensors, such as temperature sensors 28, 30, 34, 44 (FIG. 1). If water heater system 10 is in communication with an external thermostat or other controller, INPUT/OUTPUT block 710 may accommodate externally-derived control signals, and/or provide status and/or other information, as desired. In some cases, INPUT/OUTPUT block 710 may provide appropriate output command signals to an electrically controlled gas valve (not illustrated) within control unit 18, or other electrically controlled valve. For example, the INPUT/OUTPUT block 710 may provide communication signals to the electronically controlled mixing valve 32 to change the ratio of hot water to cold water as needed to achieve the desired water temperature exiting the water outlet 40.

In some instances, controller 700 may include a microprocessor 720 that may be configured to accept appropriate signals from INPUT/OUTPUT block 710, and to determine appropriate output signals that can be output via INPUT/OUTPUT block 710, such as to other components within control unit 18 (FIG. 1) and/or to an external thermostat or other controller. Microprocessor 720 may be programmed to accept a temperature signal from one or more temperature sensors, such as temperature sensors 28, 30, 34, 44 (FIG. 1), and to calculate or otherwise determine a command temperature to alter the temperature value received from the temperature sensors 28, 30, 34, 44 in order to account or compensate for temperature differentials and/or thermal lag caused by the partial thermal isolation (if present) of the temperature sensors 28, 30, 34, 44 from the water in the water tank 12 and/or pipes 15, 16, 40. The microprocessor 720 may be also be programmed to determine a command temperature based on the current or expected hot water demand on the water heater system 10. While not explicitly illustrated, microprocessor 720 may also include memory and/or other components.

It is contemplated that the control unit 18 may include a control algorithm for operating the mixing valve 32 based on the desired water temperature at the water outlet 40. For example, the control unit 18 may include a controller configured to provide signals to the mixing valve 32 via communication line 42 to change the ratio of hot water to cold water based on feedback received from the user interface 36, the outlet water temperature sensor 34, the cold water temperature sensor 30 and/or the hot water temperature sensor 44. While the mixing valve 32 has been described as an electronically controllable mixing valve, it is contemplated that the mixing valve 32 may be a non-electronically controlled mixing valve (e.g. thermally controlled mixing valve).

The hot water capacity of the water tank 12 may depend on the temperature setpoint of the water within the water tank 12, the temperature of the cold water entering the water tank 12 through the cold water inlet 15, and the desired temperature of the water exiting the water outlet 40. For example, given two water heater systems 10 having the same temperature setpoint within the water tank 12, and the same temperature of the cold water entering the water tank 12, the system having the lower water temperature exiting the water outlet 40 will have a larger capacity. Likewise, given two water heater systems 10 having different temperature setpoints within the water tank 12, and the same temperature of the cold water entering the water tank 12 and the same desired water temperature exiting the water outlet 40, the water heater system with the higher temperature setpoint will have the larger capacity.

In some cases, a water heater system 10 having a water tank 12 may also be plumbed in series with an instantaneous water heater (not explicitly shown). In some instances, the water tank 12 may be configured to maintain the temperature of the water at a desired temperature. It is contemplated that the temperature of the water in the water tank 12 may be greater than, less than, or equal to the desired final water temperature. When an instantaneous water heater is used in series with a water tank 12, the water may flow from the water outlet 40 and into the instantaneous water heater. The instantaneous water heater may then further heat the water, if necessary, to the desired water temperature before delivering the water to the desired location. This may further increase the effective hot water capacity of the water heater system 10.

It is contemplated that a variety of water tank configurations may be provided to allow a water heater system to provide the hot water capacity of a larger tank while being more energy efficient. FIG. 2A is a schematic view of another illustrative but non-limiting water heater system 100. The illustrative water heater system 100 of FIG. 2A may include a first water tank 112 and a second water tank 130 plumbed in series with one another. While the system 100 is illustrated as having two tanks 112, 130, it is contemplated that the system 100 may include any number of tanks desired, such as, but not limited to three, four, or more. In some instances, the first water tank 112 may have a larger tank volume than the second water tank 130. However, this is not required. It is contemplated that the first water tank 112 and the second water tank 130 may have the same volume or the second water tank 130 may have a larger tank volume than the first water tank 112. The first water tank 112 and second water tank 130 may be standard (e.g. non-condensing) atmospheric water tanks or any form of storage water tanks as desired. In some instances, the first water tank 112 and the second water tank 130 may be physically separate structures as shown in FIG. 2A. In other instances, the first water tank 112 and the second water tank 130 may be fluidly isolated volumes that are part of the same assembly. In some embodiments, the first water tank 112 and/or second water tank 130 may be replaced with a tankless (or instantaneous) water heater.

The first water tank 112 may include an insulating layer (not explicitly shown) positioned about the water tank 112 to help reduce thermal losses from the water tank 112. Cold water enters water tank 112 through a cold water line 114 and is heated by a gas burner 124. In some cases, the water tank 112 may include an electric heating element rather than a gas burner 124. When so provided, a power delivery unit (not shown) may be used to selectively apply power (i.e. current) to the electric heating element. For gas-fired water heaters, a control unit 118 may control a gas control unit, such as a gas valve, to regulate gas flow from a gas source 120 through a combustion gas line 122 and into gas burner 124. In some instances, control unit 118 may also control additional components of the water heater system. A flue 126 permits combustion byproducts to safely exit. The resulting heated water exits through a water outlet line 116.

Similarly, the second water tank 130 may include an insulating layer (not explicitly shown) positioned about the water tank 130 to help reduce thermal losses from the water tank 130. Warm and/or hot water may enter the second water tank 130 from the first water tank 112 through the water outlet line 116 and is heated by a gas burner 140. In some cases, the water tank 130 may include an electric heating element rather than a gas burner 140. When so provided, a power delivery unit (not shown) may be used to selectively apply power (i.e. current) to the electric heating element. For gas-fired water heaters, a control unit 134 may control a gas control unit, such as a gas valve, to regulate gas flow from a gas source 136 through a combustion gas line 138 and into gas burner 140. In some instances, control unit 134 may also control additional components of the water heater system. A flue 142 permits combustion byproducts to safely exit. In either case, the resulting heated water exits through a hot water line 132.

In some cases, the first water tank 112 may include a temperature sensor 128. In some cases, temperature sensor 128 may enter water tank 112 at a location laterally offset from control unit 118. In some instances, however, temperature sensor 128 may instead be located behind control unit 118 and in some cases, may be supported and retained by a common mounting bracket. In any event, water tank 112 may include an aperture that is sized and configured to accept temperature sensor 128. The aperture may include threads that are configured to accommodate corresponding matching threads on temperature sensor 128. In some cases, temperature sensor 128 has a compression or frictional fit within the aperture. In other instances, water tank 112 may include a threaded spud (not explicitly shown) that is configured to receive temperature sensor 128.

Similarly, the second water tank 130 may include a temperature sensor 144. In some cases, temperature sensor 144 may enter water tank 130 at a location laterally offset from control unit 134. In some instances, however, temperature sensor 144 may instead be located behind control unit 134 and in some cases, may be supported and retained by a common mounting bracket. In any event, water tank 130 may include an aperture that is sized and configured to accept temperature sensor 144. The aperture may include threads that are configured to accommodate corresponding matching threads on temperature sensor 144. In some cases, temperature sensor 144 has a compression or frictional fit within the aperture. In other instances, water tank 130 may include a threaded spud (not explicitly shown) that is configured to receive temperature sensor 144.

The first water tank 112 may be hooked up to a cold water line 114 for receiving cold water at a first temperature from a water source. The gas burner 124 may heat the cold water entering the first water tank 112 to a first predetermined temperature setpoint. It is contemplated that the temperature setpoint of the first water tank 112 may be greater than the temperature of the cold water entering the first water tank 112 but less than the desired output temperature of the water heater system 100. In some instances, the temperature setpoint of the first tank 112 may be equal to or greater than the desired output temperature of the water heater system 100. It is further contemplated that during periods of low hot water usage, the water in the first tank 112 may be allowed to warm to room temperature without the use of the burner 124. The heated water may exit the first water tank 112 through the water outlet line 116 and flow into the second water tank 130. The gas burner 140 may heat the water entering the second water tank 130 to a second predetermined temperature setpoint. It is contemplated that the second predetermined temperature setpoint may be greater than the first predetermined temperature setpoint of the first water tank 112. In some instances, the second predetermined temperature setpoint may be the desired hot water setpoint for the water heater system 100. It is contemplated that by maintaining the water temperature of the first water tank 112 at a lower temperature than the hot water setpoint for the water heater system 100, water heater system 100 may reduce standby losses and the overall water heater system 100 efficiency factor (EF) rating may be improved.

In some instances, the gas burner 124 on the first water tank 112 may be a standard size for the size of the water tank 112 and the gas burner 140 on the second water tank 130 may be oversized (not explicitly shown) for the size of the water tank 130. This may allow the gas burner 140 in the second water tank 130 to more quickly elevate the water temperature of the incoming water from the water outlet line 116 of the first tank 112 to the setpoint water temperature of the water heater system 100, without sacrificing the overall hot water capacity of the system. However, this is not required. It is contemplated that the reverse configuration may be used or both the first water tank 112 and the second water tank 130 may have standard size burners 124, 140 or oversized burners for the size of water tanks 112, 130, as desired.

In some instances, the gas burner 124 on the first water tank 112 may be controlled by the control unit 118 and the gas burner 140 on the second water tank 130 may be controlled by the control unit 134. The temperature sensors 128, 144 may be in communication with control units 118, 134 via a communication bus 146 or other alternative connection, wired or wireless. The control unit 118 and the control unit 134 may be in either wired or wireless communication with one another to facilitate coordinated control of the entire water heater system 100. In such an arrangement, for example, one control may act as a master and the other as a slave. This communication may allow for sharing of water temperature, safety status, water temperature stacking, etc. If a master/slave protocol is used, the master may be allowed to increase or decrease the temperature setpoint(s) of itself and the slave controls. In some instances, the master control may also be allowed to lockout any of the controls, depending on the safety status that was communicated to the master from the slave(s). It is also contemplated that a single overall control module (not explicitly shown) may be used for both tanks 112, 130, especially if both tanks 112, 130 are part of the same assembly (not explicitly shown). It is further contemplated that, while not explicitly shown, the water heater system 100 may include a user interface to allow a user to view and/or change the water heater system 100 parameters, such as, but not limited to, temperature setpoints of the first water tank 112 and the second water tank 130, schedule of expected high hot water demand periods, etc.

Referring briefly to FIG. 8, it will be appreciated that control units 118, 134 may include controllers. FIG. 8 is a block diagram of such a controller 700. The controller 700 may be considered as being a portion of control units 118, 134, or separate from control units 118, 134. It is contemplated that the water heater system 100 may be controlled by an algorithm in such a way as to increase the efficiency while maintaining or increasing hot water capacity. For example, when the controller 700 senses or detects a water draw in the second water tank 130, the controller may activate both the gas burner 124 and the gas burner 140, sometimes simultaneously, to help increase the hot water capacity of the water heater system 100, even though the temperature sensor 128 in the first water tank 112 may not sense the water draw via its temperature sensor for several minutes due to its larger size. This rapid turn-on algorithm may help reduce the drop in water temperature in the first water tank 112 that would otherwise occur with a control that is not configured to rapid-fire the first water tank 112. Optionally, the control algorithm may increase the setpoint temperature of the first water tank 112, at least temporarily after the second water tank 130 senses a draw on the water supply to provide more capacity.

Figure 2B:
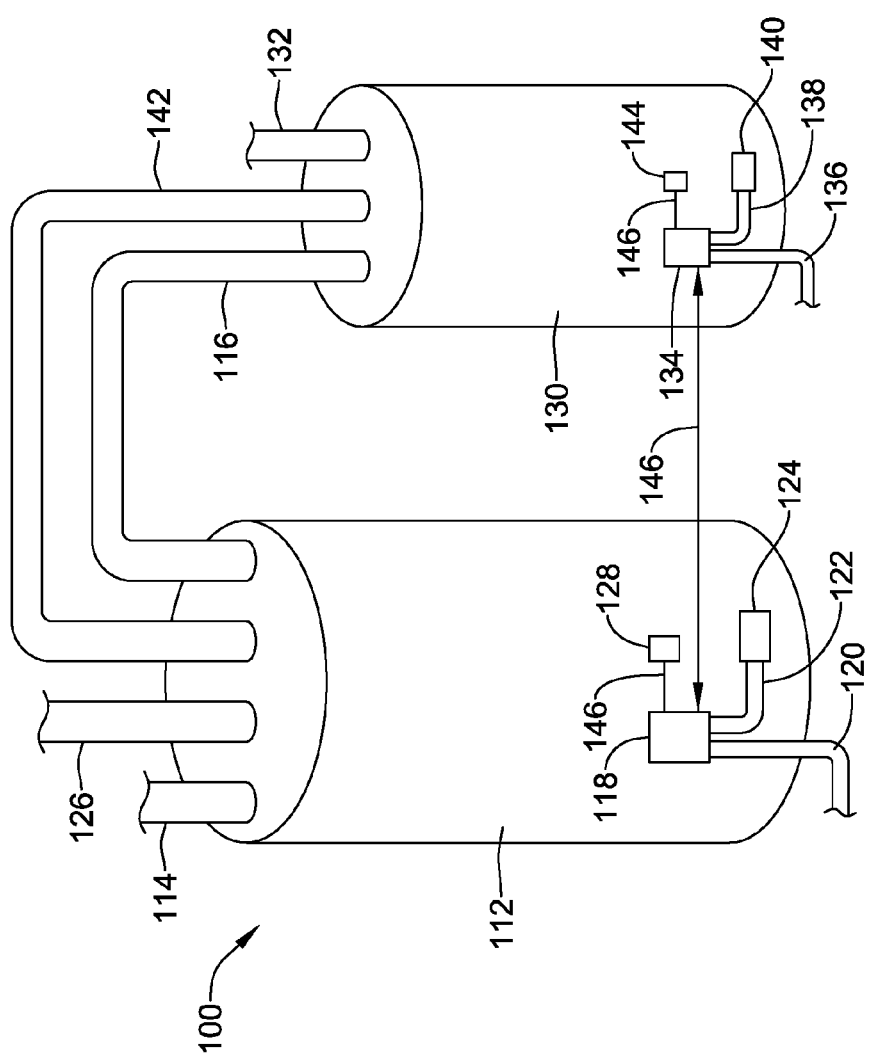
FIG. 2B is a schematic view of alternative to the illustrative but non-limiting water heater system of FIG. 2A.

In some instances, the first water tank 112 may include a flue gas condensing heat exchanger, as illustrated in FIG. 2B. That is, the flue gas exiting the second water tank 130 may be directed through the flue 142 and into a flue gas condensing heat exchanger (not explicitly shown) in the first water tank 112. It is contemplated that the heat from the flue gas in flue 142 may be used in addition to, or in place of, the gas burner 124 of the first water tank 112. If the flue gas heat exchanger is used in place of the gas burner 124, it is contemplated that the gas burner 124, combustion gas line 122, gas source 120, and flue 126 in the first water tank 112 may not be provided.

Figure 3:
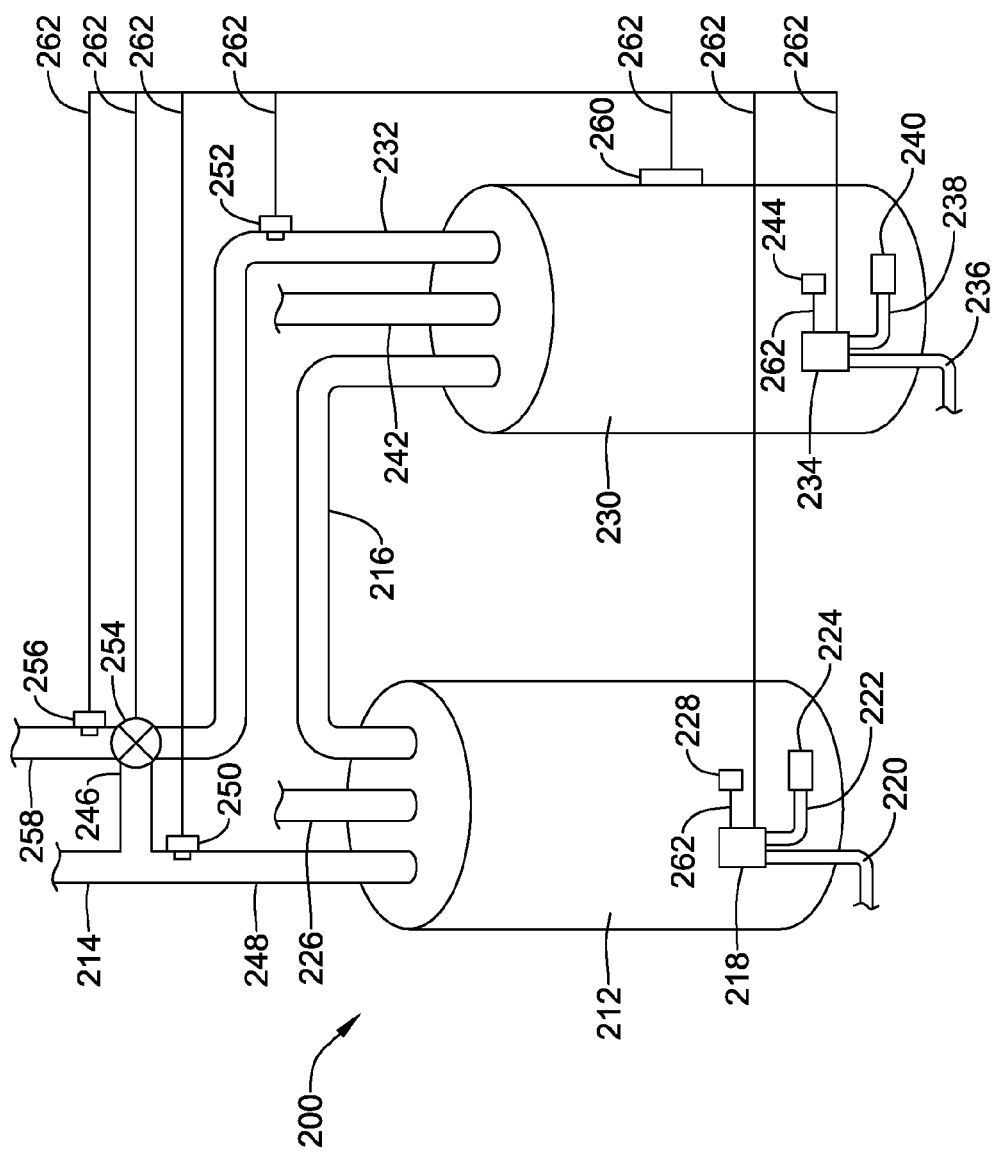
FIG. 3 is a schematic view of another illustrative but non-limiting water heater system.

FIG. 3 illustrates another exemplary water heater system 200. The water heater system 200 may include a first water tank 212 and a second water tank 230 plumbed in series with one another as shown. While the water heater system 200 is illustrated as having two tanks 212, 230, it is contemplated that the water heater system 200 may include any number of tanks desired, such as, but not limited to three, four, or more. In some embodiments, the first and second water tanks 212, 230 may be two smaller tanks (for example, the tanks 212, 230 may each be less than 60 gallons, less than 50 gallons, less than 40 gallons, less than 30 gallons, etc.). It is contemplated that the first water tank 212 and the second water tank 230 may have the same volume. However, this is not required. It is contemplated that in some instances the first water tank 212 may have a larger tank volume than the second water tank 230, or the second water tank 230 may have a larger tank volume than the first water tank 212. The first water tank 212 and second water tank 230 may be standard (e.g. non-condensing) atmospheric water tanks or any form of storage water tanks desired. In some instances, the first water tank 212 and the second water tank 230 may be physically separate structures as shown in FIG. 3. In other instances, the first water tank 212 and the second water tank 230 may be fluidly isolated volumes that are part of the same assembly. In some embodiments, the first water tank 212 and/or second water tank 230 may be replaced with a tankless (or instantaneous) water heater.

The first water tank 212 may include an insulating layer (not explicitly shown) positioned about the water tank 212 to help reduce thermal losses from the water tank 212. Cold water enters water tank 212 through a cold water line 214 and is heated by a gas burner 224. In some cases, the water tank 212 may include an electric heating element rather than a gas burner 224. When so provided, a power delivery unit (not shown) may be used to selectively apply power (i.e. current) to the electric heating element. For gas-fired water heaters, a control unit 218 may control a gas control unit, such as a gas valve, to regulate gas flow from a gas source 220 through a combustion gas line 222 and into gas burner 224. In some instances, control unit 218 may also control additional components of the water heater system. A flue 226 permits combustion byproducts to safely exit. Regardless of the power source of the first water tank 212 (gas, oil, electric, etc.), the resulting heated water exits through a water outlet line 216.

Similarly, the second water tank 230 may include an insulating layer (not explicitly shown) positioned about the water tank 230 to help reduce thermal losses from the water tank 230. Warm and/or hot water may enter the second water tank 230 from the first water tank 212 through the water outlet line 216 and is heated by a gas burner 240. In some cases, the water tank 230 may include an electric heating element rather than a gas burner 240. When so provided, a power delivery unit (not shown) may be used to selectively apply power (i.e. current) to the electric heating element. For gas-fired water heaters, a control unit 234 may control a gas control unit, such as a gas valve, to regulate gas flow from a gas source 236 through a combustion gas line 238 and into gas burner 244. In some instances, control unit 234 may also control additional components of the water heater system. A flue 242 permits combustion byproducts to safely exit. Regardless of the power source of the first water tank 230 (gas, oil, electric, etc.), the resulting heated water exits through a hot water line 232.

The first water tank 212 may include a temperature sensor 228. In some cases, temperature sensor 228 may enter water tank 212 at a location laterally offset from control unit 218. In some instances, however, temperature sensor 228 may instead be located behind control unit 218 and in some cases, may be supported and retained by a common mounting bracket. In any event, water tank 212 may include an aperture that is sized and configured to accept temperature sensor 228. The aperture may include threads that are configured to accommodate corresponding matching threads on temperature sensor 228. In some cases, temperature sensor 228 has a compression or frictional fit within the aperture. In other instances, water tank 212 may include a threaded spud (not explicitly shown) that is configured to receive temperature sensor 228.

Similarly, the second water tank 230 may include a temperature sensor 244. In some cases, temperature sensor 244 may enter water tank 230 at a location laterally offset from control unit 234. In some instances, however, temperature sensor 244 may instead be located behind control unit 234 and in some cases, may be supported and retained by a common mounting bracket. In any event, water tank 230 may include an aperture that is sized and configured to accept temperature sensor 244. The aperture may include threads that are configured to accommodate corresponding matching threads on temperature sensor 244. In some cases, temperature sensor 244 has a compression or frictional fit within the aperture. In other instances, water tank 230 may include a threaded spud (not explicitly shown) that is configured to receive temperature sensor 244.

The first water tank 212 may be hooked up to a cold water line 214 for receiving cold water from a water source. In some instances, the cold water line 214 may include a branch line 246 directly connected to an electronically controlled mixing valve 254 for injecting some cold water into the mixing valve 254, as will be discussed in more detail below, while some cold water passes through cold water inlet 248 and into the first water tank 212. The gas burner 224 may heat the cold water entering the first water tank 212 to a first predetermined temperature setpoint. It is contemplated that the temperature setpoint of first water tank 212 may be greater than the temperature of the cold water entering the first water tank 212 but less than the desired output temperature of the water heater system 200 at the mixed water outlet line 258. In some instances, the temperature setpoint of the first tank 212 may be equal to or greater than the desired output temperature of the water heater system 200. It is contemplated that during periods of low water usage, the water within the first water tank 212 may be allowed to warm to room temperature without the use of the burner 224 to help conserve energy.

The heated water may exit the first water tank 212 through the water outlet line 216 and flow into the water inlet of the second water tank 230. The gas burner 240 of the second water tank 230 may heat the water entering the second water tank 230 to a second predetermined temperature setpoint. It is contemplated that the second predetermined temperature setpoint may be greater than the first predetermined temperature setpoint of the first water tank 212, although this is not required. In some instances, the second predetermined temperature setpoint may be the desired hot water setpoint for the water heater system 200. In other instances, the second predetermined temperature setpoint may be higher than the desired water temperature exiting the water heater system 200 at the water outlet line 258. It is contemplated that by maintaining the water temperature of the first water tank 212 at a lower temperature, the water heater system 200 may reduce standby losses and the overall water heater system 200 efficiency rating may be improved.

Heated water may exit the second water tank 230 through hot water line 232. The water heater system 200 may include an electronically controlled mixing valve 254 for injecting a regulated amount of cold water into the hot water line 232 to achieve a desired temperature at the water outlet 258. As noted above, the temperature of the hot water exiting the second water tank 230 may be hotter than the desired outlet 258 water temperature and thus the cold water may be used to temper, or cool, the hot water leaving the tank to achieve the desired outlet temperature. While the system as shown as having a branch cold water line 246, a separate cold water line may be connected directly to the mixing valve 254.

It is contemplated that the temperature of the water exiting the water outlet 258 and the temperature setpoint of the first and second water tanks 212, 230 may be selected to be any value desired based on the particular application. The operating setpoint of the water tanks 212, 230 may be selected based on a number of variables, such as, but not limited to, the temperature of the cold water entering the first water tank 212, the desired water temperature at the water outlet 258, the volume of the water tanks 212, 230 and/or the percent of usable hot water in the water tanks 212, 230, etc. It is further contemplated that the proportion of cold water entering mixing valve 254 from the branch line 246 to the hot water entering the mixing valve 254 from the hot water line 232 may be dependent upon a number of variables, such as, but not limited to, the temperature of the cold water entering the mixing valve 254, the temperature of the hot water entering the mixing valve 254, and/or the desired water temperature at the water outlet 258, etc. In some cases, the operating setpoints and/or the proportion of cold water entering mixing valve 254 may be dynamic, and may vary with time, the temperature of the cold water entering the first water tank 212, the desired water temperature at the water outlet 258, the volume of the water tanks 212, 230, the percent of usable hot water in the water tanks 212, 230, and/or any other variable, as desired.

In some instances, the gas burner 224 on the first water tank 212 may be of a standard size for the size of the water tank 212 (e.g. standard BTU/gallon), and the gas burner 240 on the second water tank 230 may be oversized for the size of the water tank 230 (larger BTU/gallon). That is, and in some cases, the gas burner 224 may have a first heat output and the gas burner 240 may have a second heat output, wherein the ratio of the second heat output to the water volume of the second water tank 230 may be greater than the ratio of the first heat output to the water volume of the first water tank 212. This may help the gas burner 240 in the second water tank 230 to more quickly elevate the water temperature of the incoming water from the water outlet line 216 to the setpoint water temperature without sacrificing the overall hot water capacity of the system. However, this is not required. It is contemplated that the reverse configuration may be used or both the first water tank 212 and the second water tank 230 may have standard size or oversized burners 224, 240 for the size of the water tanks 212, 230.

The mixed water outlet 258 may include an outlet water temperature sensor 256 for measuring the temperature of the water exiting the water heater system 200. In some embodiments, a temperature sensor 252 may be provided in the hot water line 232 and a temperature sensor 250 may be provided in the cold water line 214 to help improve control of the water temperature exiting the water heater system 200 at the outlet line 258. It is contemplated that the mixing valve 254 and the outlet water temperature sensor 256 may be connected to the control units 218, 234 via a communication bus 262, or other alternative connection. For example, it is contemplated that the mixing valve 254 and temperature sensor 256 may be in wired or wireless communication with the control units 218, 234. Similarly, temperature sensors 228, 244, 250, 252 may be in communication with the control units 218, 234 via a communication bus 262 or other alternative connection. It is contemplated that the temperature sensors 228, 244, 250, 252 may be in wired or wireless communication with the control units 218, 234. The water heater system 200 may include an optional Man-Machine Interface (MMI) or user interface 260. The user interface 260 may allow a user to view and/or modify temperature setpoints and other control features.

In some instances, the gas burner 224 on the first water tank 212 may be controlled by control unit 218 and the gas burner 240 on the second water tank 230 may be controlled by control unit 234. The control unit 218 and the control unit 234 may be in either wired or wireless communication with one another to facilitate control of the entire water heater system 200. In such an arrangement, one control may act as master and the other as slave. This communication may allow for sharing of water temperature, safety status, water temperature stacking, etc. If a master/slave protocol is used, the master may be allowed to increase or decrease the temperature setpoint(s) of itself and the slave controls. In some instances, the master control may also be allowed to lockout any of the controls (master and/or slave controls), depending on the safety status that was communicated to the master. It is also contemplated that a single overall control module (not explicitly shown) may be used for both tanks 212, 230, especially if both tanks 212, 230 are part of the same assembly (not explicitly shown).

Referring briefly to FIG. 8, it will be appreciated that control units 218, 234 may include controllers. FIG. 8 is a block diagram of such a controller 700. The controller 700 may be considered as being a portion of control units 218, 234, or separate from control units 218, 234. Controller 700 may have several blocks. In some cases, controller 700 may have an INPUT/OUTPUT block 710 that accepts signals from the temperature sensors 228, 244, 250, 252, 256 (FIG. 3). If water heater system 200 is in communication with an external thermostat or other controller, INPUT/OUTPUT block 710 may accommodate externally-derived control signals, and/or provide status and/or other information, as desired. In some cases, INPUT/OUTPUT block 710 may also provide appropriate output command signals to an electrically controlled gas valve (not illustrated) within control units 218, 234, or other electrically controlled valve, such as mixing valve 254.

In some instances, controller may include a microprocessor 720 that may be configured to accept appropriate signals from INPUT/OUTPUT block 710, and to determine appropriate output signals that can be outputted via INPUT/OUTPUT block 710, such as to other components within control units 218, 234 (FIG. 3) and/or to an external thermostat or other controller. Microprocessor 720 may be programmed to accept a temperature signal from temperature sensors 228, 244, 250, 252, 256 (FIG. 3), and to calculate or otherwise determine a command temperature that alters the temperature value received from the temperature sensors 228, 244, 250, 252, 256 in order to account or compensate for temperature differentials and/or thermal lag caused by the partial thermal isolation (if present) of the temperature sensors 228, 244, 250, 252, 256 from the water in the water tanks 212, 230 or water lines 214, 232, 258. The microprocessor 720 may be also be programmed to determine a command temperature based on the current or expected hot water demand on the water heater system 200. While not explicitly illustrated, microprocessor 720 may also include memory and/or other components.

It is contemplated that one or both of the control units 218, 234 may include a control algorithm for operating the mixing valve 254 based on the desired water temperature at the water outlet 258. For example, the control units 218, 234 may include a controller configured to provide signals to the mixing valve 254 via communication line 262 to change the ratio of hot water to cold water based on feedback received from the user interface 260, the outlet water temperature sensor 256, the cold water temperature sensor 250, and/or the hot water temperature sensor 252. While the mixing valve 254 has been described as an electronically controllable mixing valve, it is contemplated that the mixing valve 254 may be a non-electronically controlled mixing valve (e.g. a thermally controlled mixing valve). It is contemplated that one or more mixing valves 254 may be used with any size of tank and with any number of tanks.

The hot water capacity may depend on the temperature setpoint of the water within the water tanks 212, 230, the temperature of the cold water entering the first water tank 212 through the cold water inlet 248, the temperature of the water exiting the first water tank 212 through the water line 216, the temperature of the water exiting the second water tank 230 through the water line 232 and the desired temperature of the water exiting the water outlet 258.

In some instances, the water heater system 200 may be controlled by an algorithm in such a way as to increase the efficiency while maintaining or increasing hot water capacity. For example, the instant that the second water tank 230 senses a draw on the water supply, both the first gas burner 224 and the second gas burner 240 may fire simultaneously to help maintain the hot water capacity of the system, even though the temperature sensor 228 in the first water tank 212 may not sense the draw for several minutes. This rapid turn-on algorithm may help reduce the drop in water temperature in the first water tank 212 that would otherwise occur with a control that is not configured to rapid-fire the first water tank 212. Optionally, the control algorithm may increase the setpoint temperature of the first water tank 212, at least temporarily after the second water tank 230 senses a draw on the water supply to provide more capacity.

While not explicitly shown, it is further contemplated that in some instances, the first water tank 212 may include a flue gas condensing heat exchanger. In some embodiments, the flue gas exiting the second water tank 230 may be directed through the flue 242 and into a heat exchanger (not explicitly shown) in the first water tank 212. It is contemplated that the heat from the flue gas in flue 242 may be used in addition to, or in place of, the gas burner 224. If the flue gas heat exchanger is used in place of the gas burner 224, it is contemplated that the gas burner 224, combustion gas line 222, gas source 220, and flue 226 in the first water tank 212 may not be necessary. The reverse configuration may also be used.

Referring to FIGS. 2A, 2B, and 3, in some instances, the water heater system 100, 200 may use the relationship between hot water usage and the time of day to determine the most efficient way to heat the first and second tanks 112, 212, 130, 230. In some embodiments, the relationship between hot water usage and the time of day may be entered into the user interface 260, if so provided, directly by a user. In other embodiments, the controller(s) 118, 134, 218, 234 may utilize an algorithm that monitors hot water usage to develop a schedule of expected hot water demand. For systems without a water flow rate sensor, the controller(s) 118, 134, 218, 234 may indirectly estimate hot water usage by monitoring the water temperature and/or call-for-heat signals. For systems with a water flow rate sensor, the controller(s) 118, 134, 218, 234 may use that signal to directly measure hot water usage over time. This information may be used to construct a schedule of expected hot water demand over time.

For water heaters with an integrated controller, the controllers of each water heater may communicate as master/slaves, as discussed above, or via another communication protocol, to work together to adjust the temperature setpoint of each water tank 112, 130, 212, 230. For water heater systems without an integrated controller, a single controller may be used to control the temperature set points of all of the water tanks. Based on the configuration of the water heaters (e.g. series or parallel), the required hot-water capacity at a given time of day, and whether there are any mixing or shutoff valves at the water heater outlets, the temperature setpoints of each of the water tanks 112, 130, 212, 230 may be optimized such that the water tanks 112, 130, 212, 230 as a group meet the immediate hot-water demands of the user.

In one example, a system including two tanks in series, such as tanks 112, 130 or tanks 212, 230, the first tank 112, 212 may receive cold water with a first temperature T1 and may heat the water to a second temperature T2. For illustrative purposes only, the first and second tanks 112, 212, 130, 230 may each have a volume of 30 gallons. The second tank 130, 230 receives heated water from the first tank 112, 212 and heats the water to the desired temperature T3, which may be greater than T2. The water from the second tank 130, 230 may be output to the hot water distribution system. If the predicted hot water demand for the user at the current time is 10 gallons, the master control may reduce the temperature setpoint of the first tank 112, 212 to T1 and leave the temperature setpoint of the second tank 130, 230 at a temperature that would provide 10 gallons of water at temperature T3. Such a control algorithm may prevent the burner 124, 224 on the first tank 112, 212 from heating the water in the first tank 112, 212 unnecessarily. If, however, the predicted hot water demand for the user at the current time is 45 gallons, the master control may change the temperature setpoint of the first tank 112, 212 to just below T3 and leave the temperature setpoint of the second tank 130, 230 at T3 or above. This may allow the system 100, 200 to provide more than 30 gallons of water without heating both the first tank 112, 212 and the second tank 130, 230 to the desired temperature T3 at all times.

Figure 4:
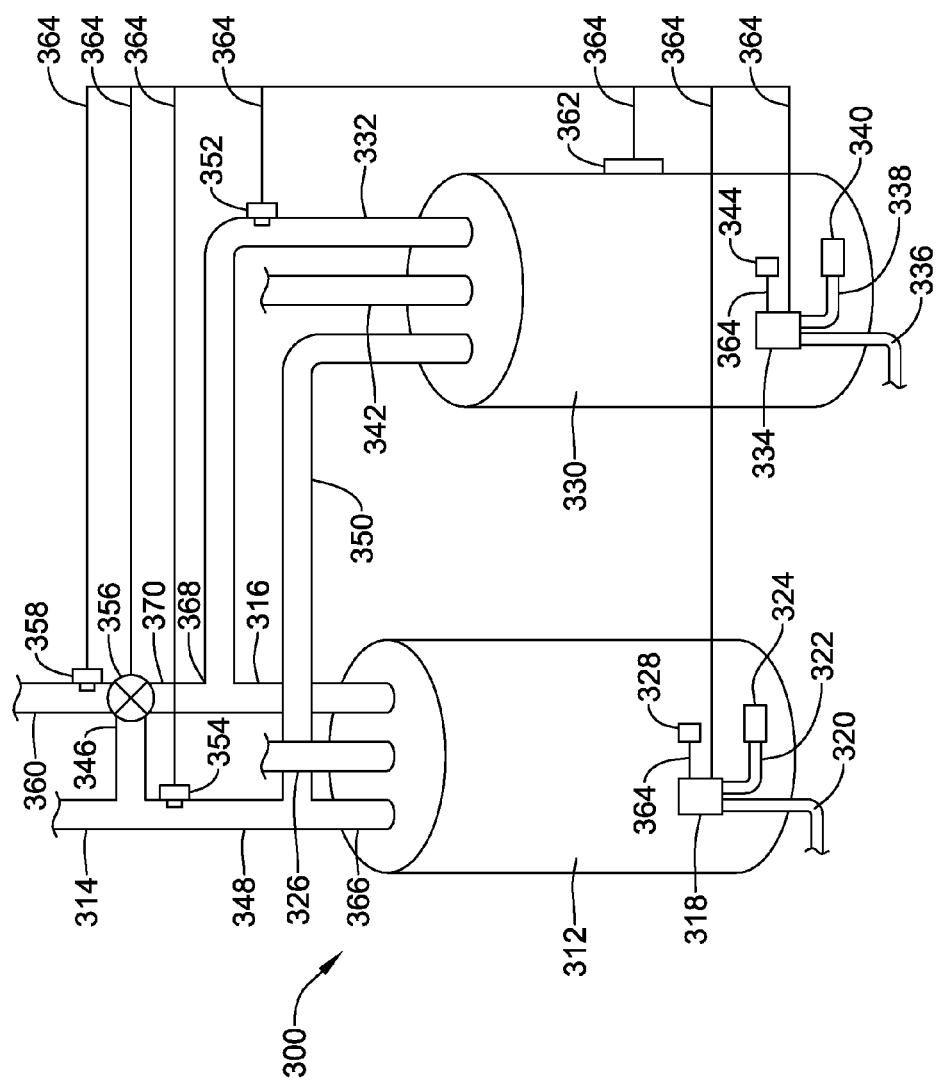
FIG. 4 is a schematic view of another illustrative but non-limiting water heater system.

FIG. 4 illustrates another exemplary water heater system 300. The water heater system 300 may include a first water tank 312 and a second water tank 330 plumbed in parallel with one another. While the system 300 is illustrated as having two tanks 312, 330, it is contemplated that the system 300 may include any number of tanks desired, such as, but not limited to three, four, or more. In some embodiments, the first and second water tanks 312, 330 may be two smaller tanks (for example, the tanks 312, 330 may each be less than 60 gallons, less than 50 gallons, less than 40 gallons, less than 30 gallons, etc.). It is contemplated that the first water tank 312 and the second water tank 330 may have the same volume. However, this is not required. In some instances the first water tank 312 may have a larger tank volume than the second water tank 330, or the second water tank 330 may have a larger tank volume than the first water tank 312. The first water tank 312 and the second water tank 330 may be standard (e.g. non-condensing) atmospheric water tanks, or any form of storage water tanks desired. In some instances, the first water tank 312 and the second water tank 330 may be physically separate structures as shown in FIG. 4. In other instances, the first water tank 312 and the second water tank 330 may be fluidly isolated volumes that are part of the same assembly. In some embodiments, the first water tank 312 and/or second water tank 330 may be replaced with a tankless (or instantaneous) water heater.

The first water tank 312 may include an insulating layer (not explicitly shown) positioned about the water tank 312 to help reduce thermal losses from the water tank 312. Cold water enters water tank 312 through a cold water line 314 and is heated by a gas burner 324. In some cases, the water tank 312 may include an electric heating element rather than a gas burner 324. When so provided, a power delivery unit (not shown) may be used to selectively apply power (i.e. current) to the electric heating element. For gas-fired water heaters, a control unit 318 may control a gas control unit, such as a gas valve, to regulate gas flow from a gas source 320 through a combustion gas line 322 and into gas burner 324. In some instances, control unit 318 may also control additional components of the water heater system. A flue 326 permits combustion byproducts to safely exit. Regardless of the power source of the first water tank 312 (gas, oil, electric, etc.), the resulting heated water exits through a water outlet line 316.

Similarly, the second water tank 330 may include an insulating layer (not explicitly shown) positioned about the water tank 330 to help reduce thermal losses from the water tank 312. Cold water may enter the second water tank 330 through a cold water line 350 branched off of a cold water line 314 and is heated by a gas burner 340. In some instances, cold water may be supplied to the second water tank 330 through a separate cold water supply. In some cases, the water tank 330 may include an electric heating element rather than a gas burner 340. When so provided, a power delivery unit (not shown) may be used to selectively apply power (i.e. current) to the electric heating element. For gas-fired water heaters, a control unit 334 may control a gas control unit, such as a gas valve, to regulate gas flow from a gas source 336 through a combustion gas line 338 and into gas burner 344. In some instances, control unit 334 may also control additional components of the water heater system. A flue 342 permits combustion byproducts to safely exit. Regardless of the power source of the first water tank 330 (gas, oil, electric, etc.), the resulting heated water exits through a water outlet line 332.

The first water tank 312 may include a temperature sensor 328. In some cases, temperature sensor 328 may enter water tank 312 at a location laterally offset from control unit 318. In some instances, however, temperature sensor 328 may instead be located behind control unit 318 and in some cases, may be supported and retained by a common mounting bracket. In any event, water tank 312 may include an aperture that is sized and configured to accept temperature sensor 328. The aperture may include threads that are configured to accommodate corresponding matching threads on temperature sensor 328. In some cases, temperature sensor 328 has a compression or frictional fit within the aperture. In other instances, water tank 312 may include a threaded spud (not explicitly shown) that is configured to receive temperature sensor 328.

Similarly, the second water tank 330 may include a temperature sensor 344. In some cases, temperature sensor 344 may enter water tank 330 at a location laterally offset from control unit 334. In some instances, however, temperature sensor 344 may instead be located behind control unit 334 and in some cases, may be supported and retained by a common mounting bracket. In any event, water tank 330 may include an aperture that is sized and configured to accept temperature sensor 344. The aperture may include threads that are configured to accommodate corresponding matching threads on temperature sensor 344. In some cases, temperature sensor 344 has a compression or frictional fit within the aperture. In other instances, water tank 330 may include a threaded spud (not explicitly shown) that is configured to receive temperature sensor 344.

Both the first water tank 312 and the second water tank 330 may be hooked up to a cold water line 314 for receiving cold water from a water source. In some instances, the cold water line 314 may include a branch line 346 directly connected to an electronically controlled mixing valve 356 for injecting some cold water into the mixing valve 356, as will be discussed in more detail below, while some cold water passes through another portion of the line 348 and enters the tank through the cold water inlet 366. In some embodiments, the cold water line 314 may also include a second cold water branch line 350 for delivering cold water to the second water tank 330. In other embodiments, a separate cold water supply line may be used to deliver water to the second water tank 330. The first gas burner 324 may heat the cold water entering the first water tank 312 to a first predetermined temperature setpoint, and the second gas burner 340 may heat the cold water entering the second water tank 330 to a second predetermined temperature setpoint. In some embodiments, the first and second temperature setpoints may be equal or approximately equal; however, this is not required. It is contemplated that the temperature setpoint of the first and second water tanks 312, 330 may be equal to or greater than the desired water temperature at the water outlet 360. In some cases, the first and second temperature setpoints may be different.

Heated water may exit the first water tank 312 through hot water line 316. Heated water may also exit the second water tank 330 through hot water line 332. The hot water lines 316, 332 may join together at an intersection 368. The hot water from lines 316, 332 may mix and be delivered to an electronically controlled mixing valve 356 via hot water line 370. The electronically controlled mixing valve 356 may inject a regulated amount of cold water into the hot water line 370 to achieve a desired temperature at the water outlet 360. As noted above, the temperature of the hot water exiting the first and second water tanks 312, 330 may be hotter than the desired outlet 360 water temperature and thus the cold water may be used to temper, or cool, the hot water leaving the tanks. While the system as shown as having a cold water branch line 346, a separate cold water line may be connected to the mixing valve 356.

It is contemplated that the water temperature exiting the water outlet 360 and the water temperature in the first and second water tanks 312, 330 may be selected to be any value desired based on the particular application. The operating setpoint of the water temperature within the water tanks 312, 330 may be selected based on a number of variables, such as, but not limited to, the temperature of the cold water entering the first and second water tank 312, 330, the desired water temperature at the water outlet 360, the volume of the water tanks 312, 330 and/or the percent of usable hot water in the water tanks 312, 330, etc. It is further contemplated that the proportion of cold water entering mixing valve 356 from the branch line 346 to the hot water entering the mixing valve 356 from the hot water line 370 may also be dependent upon a number of variables, such as, but not limited to, the temperature of the cold water entering the mixing valve 356, the temperature of the hot water entering the mixing valve 356, the desired water temperature at the water outlet 360, etc. In some cases, the operating setpoints and/or the proportion of cold water entering mixing valve 356 may be dynamic, and may vary with time, the temperature of the cold water entering the first water tank 312, the desired water temperature at the mixed water outlet 360, the volume of the water tanks 312, 330, the percent of usable hot water in the water tanks 312, 330, and/or any other variable, as desired.

The mixed water outlet 360 may include an outlet water temperature sensor 358 for measuring the temperature of the water exiting the water heater system 300. In some embodiments, a temperature sensor 352 may be provided in the hot water line 332 and a temperature sensor 354 may be provided in the cold water line 348 to help improve control of the water temperature exiting the water heater system 300 at the outlet line 360. While not explicitly shown, it is contemplated that a temperature sensor may also be provided in hot water line 316 and/or hot water line 370. It is contemplated that the mixing valve 356 and the outlet water temperature sensor 358 may be connected to the control units 318, 334 via a communication bus 364, or other alternative connection. For example, it is contemplated that the mixing valve 356 and temperature sensor 358 may be in wired or wireless communication with the control units 318, 334. Similarly, temperature sensors 328, 344, 352, 354 may be in communication with the control units 318, 334 via a communication bus 364 or other alternative connection. It is contemplated that the temperature sensors 328, 344, 352, 354 may be in wired or wireless communication with the control units 318, 334. The water heater system 300 may include an optional Man-Machine Interface (MMI) or user interface 362. The user interface 362 may allow a user to view and/or modify temperature setpoints and other control features.

In some instances, the gas burner 324 on the first water tank 312 may be controlled by the control unit 318, and the gas burner 340 on the second water tank 330 may be controlled by the control unit 334. The first control unit 318 and the second control unit 334 may be in either wired or wireless communication with one another to facilitate optimum control of the entire water heater system 300. In such an arrangement, for example, one control may act as master and the other as slave. This communication may allow for sharing of water temperature, safety status, water temperature stacking, etc. If a master/slave protocol is used, the master may be allowed to increase or decrease the temperature setpoint(s) of itself and the slave controls. In some instances, the master control may be allowed to lockout any of the controls, depending on the safety status that was communicated to the master. It is also contemplated that a single overall control module (not explicitly shown) might be used for both tanks 312, 330, especially if both tanks 312, 330 are part of the same assembly (not explicitly shown).

Referring briefly to FIG. 8, it will be appreciated that control units 318, 334 may include controllers. FIG. 8 is a block diagram of such a controller 700. The controller 700 may be considered as being a portion of control units 318, 334, or separate from control units 318, 334. Controller 700 may have several blocks. In some cases, controller 700 may have an INPUT/OUTPUT block 710 that accepts signals from the temperature sensors 328, 344, 352, 354, 358 (FIG. 4). If water heater system 300 is in communication with an external thermostat or other controller, INPUT/OUTPUT block 710 may accommodate externally-derived control signals, and/or provide status and/or other information, as desired. In some cases, INPUT/OUTPUT block 710 may also provide appropriate output command signals to an electrically controlled gas valve (not illustrated) within control units 318, 334, or other electrically controlled valve, such as mixing valve 356.

In some instances, controller may include a microprocessor 720 that may be configured to accept appropriate signals from INPUT/OUTPUT block 710, and to determine appropriate output signals that can be outputted via INPUT/OUTPUT block 710, such as to other components within control units 318, 334 (FIG. 4) and/or to an external thermostat or other controller. Microprocessor 720 may be programmed to accept a temperature signal from temperature sensors 328, 344, 352, 354, 358 (FIG. 4), and to calculate or otherwise determine a command temperature that alters the temperature value received from the temperature sensors 328, 344, 352, 354, 358 in order to account or compensate for temperature differentials and/or thermal lag caused by the partial thermal isolation (if present) of the temperature sensors 328, 344, 352, 354, 358 from the water in the water tanks 312, 330 or water lines 348, 332, 360. The microprocessor 720 may be also be programmed to determine a command temperature based on the current or expected hot water demand on the water heater system 300. While not explicitly illustrated, microprocessor 720 may also include memory and/or other components.

It is contemplated that one or both of the control units 318, 334 may include a control algorithm for operating the mixing valve 356 based on the desired water temperature at the water outlet 360. For example, the control units 318, 334 may include a controller configured to provide signals to the mixing valve 356 via communication line 364 to change the ratio of hot water to cold water based on feedback received from the user interface 362, the outlet water temperature sensor 358, the cold water temperature sensor 354, and/or the hot water temperature sensor 352. While the mixing valve 356 has been described as an electronically controllable mixing valve, it is contemplated that the mixing valve 356 may be a non-electronically controlled mixing valve. It is contemplated that one or more mixing valves 356 may be used with any size of tank and with any number of tanks.

The hot water capacity may depend on the temperature setpoint of the water within the water tanks 312, 330, the temperature of the cold water entering the first water tank 312 through the cold water inlet 348, the temperature of the water exiting the first water tank 312 through the water line 316, the temperature of the water exiting the second water tank 330 through the water line 332, and/or the desired temperature of the water exiting the water outlet 360.

It is contemplated that during use of the water heater system 300, hot water may be drawn from both the first and second water tanks 312, 330 evenly. However, this is not required. While not explicitly shown in FIG. 4, in some instances one or both of the hot water lines 316, 332 may include an electronically controlled shut off valve. If a predicted hot water demand for a given time period is less than the volume of one of tanks 312, 330, water may be drawn from only one of the first or second tanks 312, 330 by closing the shut off valve on the hot water outlet 316, 332.

It is further contemplated that in some instances, the first water tank 312 may include a flue gas condensing heat exchanger. In some embodiments the flue gas exiting the second water tank 330 may be directed through the flue 342 and into a heat exchanger (not explicitly shown) in the first water tank 312. It is contemplated that the heat from the flue gas in flue 342 may be used in addition to or in place of the gas burner 324. If the flue gas heat exchanger is used in place of the gas burner 324, it is contemplated that the gas burner 324, combustion gas line 322, gas source 320, and flue 326 in the first water tank 312 may not be necessary. The reverse configuration may also be used.

Figure 5:
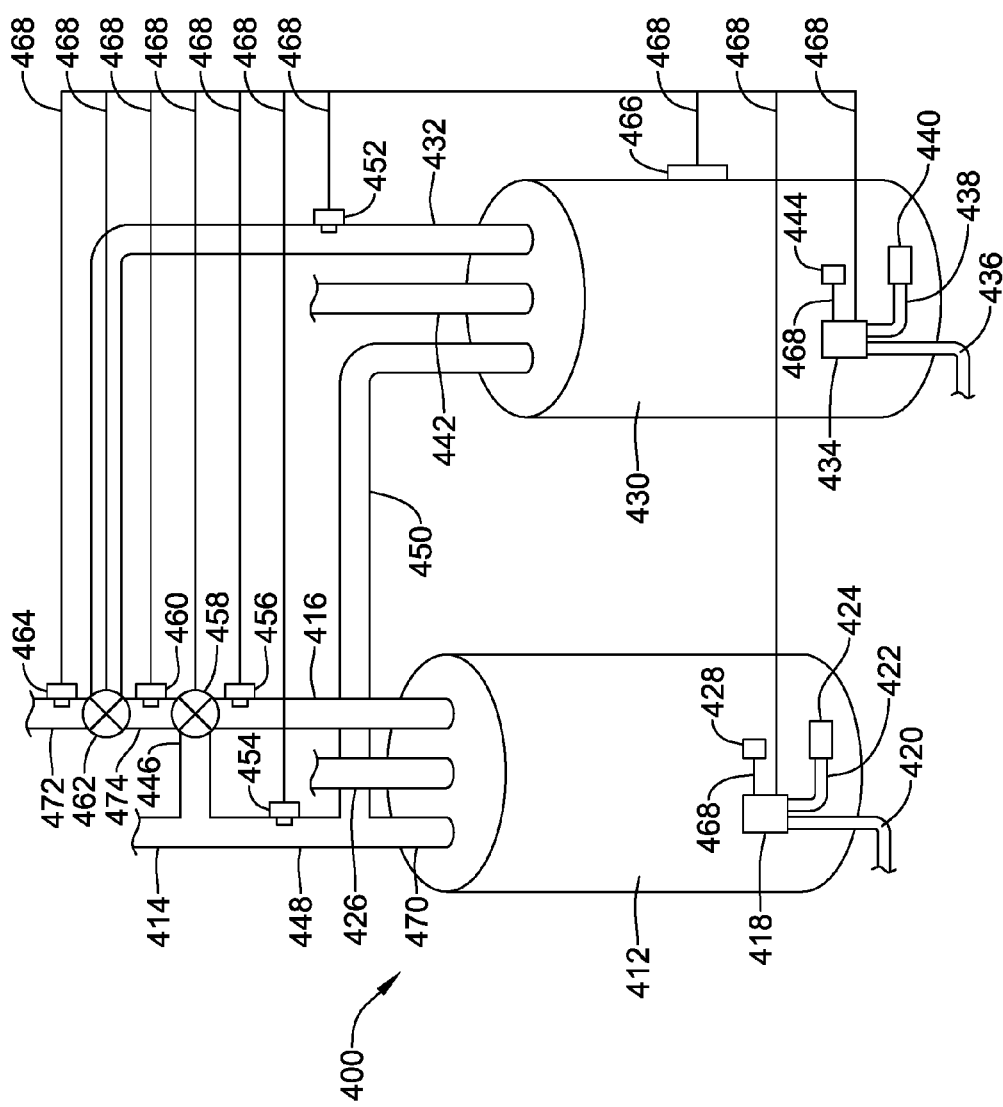
FIG. 5 is a schematic view of another illustrative but non-limiting water heater system.

FIG. 5 illustrates another exemplary water heater system 400. The water heater system 400 may include a first water tank 412 and a second water tank 430 plumbed in parallel with one another including multi-stage mixing valves. While the system 400 is illustrated as having two tanks 412, 430, it is contemplated that the system 400 may include any number of tanks desired, such as, but not limited to three, four, or more. In some embodiments, the first and second water tanks 412, 430 may be two smaller tanks (for example, the tanks 412, 430 may each be less than 60 gallons, less than 50 gallons, less than 40 gallons, less than 30 gallons, etc.). It is contemplated that the first water tank 412 and the second water tank 430 may have the same volume. However, this is not required. In some instances, the first water tank 412 may have a larger tank volume than the second water tank 430 or the second water tank 430 may have a larger tank volume than the first water tank 412. The first water tank 412 and second water tank 430 may be standard (e.g. non-condensing) atmospheric water tanks or any form of storage water tanks desired. In some instances, the first water tank 412 and the second water tank 430 may be physically separate structures as shown in FIG. 5. In other instances, the first water tank 412 and the second water tank 430 may be fluidly isolated volumes that are part of the same assembly. It is contemplated that, in some embodiments, one or both of the tanks 412, 430 may be tankless or instantaneous water heaters.

The first water tank 412 may include an insulating layer (not explicitly shown) positioned about the water tank 412 to help reduce thermal losses from the water tank 412. Cold water enters water tank 412 through a cold water line 414 and is heated by a gas burner 424. In some cases, the water tank 412 may include an electric heating element rather than a gas burner 424. When so provided, a power delivery unit (not shown) may be used to selectively apply power (i.e. current) to the electric heating element. For gas-fired water heaters, a control unit 418 may control a gas control unit, such as a gas valve, to regulate gas flow from a gas source 420 through a combustion gas line 422 and into gas burner 424. In some instances, control unit 418 may also control additional components of the water heater system. A flue 426 permits combustion byproducts to safely exit. Whether oil, gas or electric powered, the resulting heated water exits through a hot water line 416.

Similarly, the second water tank 430 may include an insulating layer (not explicitly shown) positioned about the water tank 430 to help reduce thermal losses from the water tank 412. Cold water may enter the second water tank 430 through a cold water line 450 branched off of a cold water line 414 and is heated by a gas burner 440. In some instances, cold water may be supplied to the second water tank 430 through a separate cold water supply. In some cases, the water tank 430 may include an electric heating element rather than a gas burner 440. When so provided, a power delivery unit (not shown) may be used to selectively apply power (i.e. current) to the electric heating element. For gas-fired water heaters, a control unit 434 may control a gas control unit, such as a gas valve, to regulate gas flow from a gas source 436 through a combustion gas line 438 and into gas burner 444. In some instances, control unit 434 may also control additional components of the water heater system. A flue 442 permits combustion byproducts to safely exit. Whether oil, gas or electric powered, the resulting heated water exits through a hot water line 432. The first water tank 412 may include a temperature sensor 428, and the second water tank 430 may include a temperature sensor 444.

Both the first water tank 412 and the second water tank 430 may be hooked up to a cold water line 414 for receiving cold water from a water source. In some instances, the cold water line 414 may include a branch line 446 directly connected to an electronically controlled mixing valve 458 for injecting some cold water into the mixing valve 458, as will be discussed in more detail below, while some cold water passes through another portion of the line 448 and enters the first water tank 412 through the cold water inlet 470. In some embodiments, the cold water line 414 may also include a second branch cold water line 450 for delivering cold water to the second water tank 430 as shown. In other embodiments, a separate cold water supply line may be used to deliver water to the second water tank 430. The first gas burner 424 may heat the cold water entering the first water tank 412 to a first predetermined temperature setpoint, and the second gas burner 440 may heat the cold water entering the second water tank 430 to a second predetermined temperature setpoint. In some embodiments, the first and second temperature setpoints may be equal or approximately equal; however, this is not required. It is contemplated that the temperature setpoint of the first and second water tanks 412, 430 may be equal to or greater than the desired water temperature at the water outlet 472. In some cases, the first and second temperature setpoints may be different.

Heated water may exit the first water tank 412 through hot water line 416. Cold water may be injected into the hot water line 416 at an electronically controlled mixing valve 458. As noted above, the temperature of the hot water exiting the first water tank 412 may be hotter than the desired outlet 472 water temperature and thus the cold water may be used to temper, or cool, the hot water leaving the tanks. While the system is shown as having a branch cold water line 446, it is contemplated that a separate cold water line may be connected to the mixing valve 458. The tempered water may flow through an intermediate water line 474 to a second electronically controlled mixing valve 462. The second mixing valve 462 may mix tempered water from the first mixing valve 458 with hot water exiting the second water tank 430 through hot water line 432. The electronically controlled mixing valve 462 may inject a regulated amount of hot water from the second tank 430 into the intermediate water line 474 to achieve a desired temperature at the water outlet 472. As noted above, the temperature of the hot water exiting the second water tank 430 may be hotter than the desired outlet 472 water temperature and thus the tempered water from intermediate line 474 may be used to temper, or cool, the hot water leaving the second tank 430. Alternatively, the hot water line 432 can be seen as warming the water in the intermediate line 474.

It is contemplated that the water temperature exiting the water outlet 472 and the water temperature in the first and second water tanks 412, 430 may be selected to be any value desired based on the particular application. The operating setpoint of the water temperature within the water tanks 412, 430 may be selected based on a number of variables, such as, but not limited to, the temperature of the cold water entering the first and second water tanks 412, 430, the desired water temperature at the water outlet 472, the volume of the water tanks 412, 430 and/or the percent of usable hot water in the water tanks 412, 430, etc. It is further contemplated that the proportion of cold water entering mixing valve 458 from the branch line 446 to the hot water entering the mixing valve 458 from the hot water line 416 may also be dependent upon a number of variables, such as, but not limited to, the temperature of the cold water entering the mixing valve 458, the temperature of the hot water entering the mixing valve 458, the desired water temperature at the water outlet 472, etc. The proportion of hot water entering the second mixing valve 462 from the hot water line 432 to the tempered water entering the second mixing valve 462 from intermediate line 474 may also be dependent upon a number of variables, such as, but not limited to, the temperature of the water in intermediate line 474, the temperature of the water in the hot water line 432, the desired water temperature at the water outlet 472, etc.

The mixed water outlet 472 may include an outlet water temperature sensor 464 for measuring the temperature of the water exiting the water heater system 400. The intermediate water line 474 may also include a temperature sensor 460 for measuring the temperature of the water exiting the first mixing valve 458. In some embodiments, a temperature sensor 452 may be provided in the hot water line 432, a temperature sensor 454 may be provided in the cold water line 448, and a temperature sensor 456 may be provided in hot water line 416 to improve control of the water temperature exiting the water heater system 400 at the outlet line 472, although this is not required. It is contemplated that the mixing valves 458, 462, the outlet water temperature sensor 464, and the intermediate temperature sensor 460 may be connected to the control units 418, 434 via a communication bus 468, or other alternative connection. For example, it is contemplated that the mixing valves 458, 462 and temperature sensors 460, 464 may be in wired or wireless communication with the control units 418, 434. Similarly, temperature sensors 428, 444, 452, 454, 456 may also be in communication with the control units 418, 434 via a communication bus 468 or other alternative connection. It is contemplated that the temperature sensors 428, 444, 452, 454, 456 may be in wired or wireless communication with the control units 418, 434. The water heater system 400 may include an optional Man-machine interface (MMI) or user interface 466. The user interface 466 may allow a user to view and/or modify temperature setpoints and other control features.

In some instances, the gas burner 424 on the first water tank 412 may be controlled by control unit 418 and the gas burner 440 on the second water tank 430 may be controlled by control unit 434. The first control unit 418 and the second control unit 434 may be in either wired or wireless communication with one another to facilitate optimum control of the entire water heater system 400. In such an arrangement, for example, one control may act as master and the other as slave. This communication may allow for sharing of water temperature, safety status, water temperature stacking, etc. If a master/slave protocol is established, the master may be allowed to increase or decrease the temperature setpoint(s) of itself and the slave controls. In some instances, the master control may also be allowed to lockout any of the controls, depending on the safety status that was communicated to the master. It is also contemplated that a single overall control module (not explicitly shown) might be used for both tanks 412, 430, especially if both tanks 412, 430 are part of the same assembly (not explicitly shown).

Referring briefly to FIG. 8, it will be appreciated that control units 418, 434 may include controllers. FIG. 8 is a block diagram of such a controller 700. The controller 700 may be considered as being a portion of control unit 418, 434, or separate from control unit 418, 434. Controller 700 may have several modules. In some cases, controller 700 may have an INPUT/OUTPUT block 710 that accepts signals from the temperature sensors 428, 444, 452, 454, 456, 464 (FIG. 5). If water heater system 400 is in communication with an external thermostat or other controller, INPUT/OUTPUT block 710 may accommodate externally-derived control signals, and/or provide status and/or other information, as desired. In some cases, INPUT/OUTPUT block 710 may also provide appropriate output command signals to an electrically controlled gas valve (not illustrated) within control units 418, 434, or other electrically controlled valve, such as mixing valves 458, 462.

In some instances, controller may include a microprocessor 720 that may be configured to accept appropriate signals from INPUT/OUTPUT block 710, and to determine appropriate output signals that can be outputted via INPUT/OUTPUT block 710, such as to other components within control units 418, 434 (FIG. 5) and/or to an external thermostat or other controller. Microprocessor 720 may be programmed to accept a temperature signal from temperature sensors 428, 444, 452, 454, 456, 464 (FIG. 5), and to calculate or otherwise determine a command temperature that alters the temperature value received from the temperature sensors 428, 444, 452, 454, 464 in order to account or compensate for temperature differentials and/or thermal lag caused by the partial thermal isolation (if present) of the temperature sensors 428, 444, 452, 454, 464 from the water in the water tanks 412, 430 or water lines 416, 432, 448, 472, 474. The microprocessor 720 may be also be programmed to determine a command temperature based on the current or expected hot water demand on the water heater system 400. While not explicitly illustrated, microprocessor 720 may also include memory and/or other components.

It is contemplated that one or both of the control units 418, 434 may include a control algorithm for operating the mixing valves 458, 462 based on the desired water temperature at the water outlet 472. For example, the control units 418, 434 may include a controller configured to provide signals to the mixing valve 458 via communication line 468 to change the ratio of hot water to cold water based on feedback received from the user interface 466, the intermediate water temperature sensor 460, the cold water temperature sensor 454, and/or the hot water temperature sensor 456. While the mixing valve 458 has been described as an electronically controllable mixing valve, it is contemplated that the mixing valve 458 may be a non-electronically controlled mixing valve. The control units 418, 434 may also include a controller configured to provide signals to the second mixing valve 462 via communication line 468 to change the ratio of hot water to tempered water based on feedback received from the user interface 466, the outlet water temperature sensor 464, the intermediate water temperature sensor 460, and/or the hot water temperature sensor 452. While the mixing valve 462 has been described as an electronically controllable mixing valve, it is contemplated that the mixing valve 462 may be a non-electronically controlled mixing valve.

The hot water capacity may depend on the temperature setpoint of the water within the water tanks 412, 430, the temperature of the cold water entering the first water tank 412 through the cold water inlet 448, the temperature of the water exiting the first water tank 412 through the water line 416, the temperature of the water exiting the second water tank 430 through the water line 432 and the desired temperature of the water exiting the water outlet 472.

It is contemplated that during use of the water heater system 400, hot water may be drawn from both the first and second water tanks 412, 430 evenly. However, this is not required. For example, during periods of expected low water draw, the first water tank 412 may be maintained at a lower set point temperature than the second water tank 430, and may be used to temper the hot water from the second water tank 430 via the mixing valve 462. In this and other scenarios, hot water may be drawn from the first and second water tanks 412, 430 unevenly.

While not explicitly shown, in some instances, one or both of the hot water lines 416, 432 may include an electronically controlled shut off valve. If the predicted hot water demand for a given time period is less than the volume of one of tanks 412, 430, water may be drawn from only one of the first or second tanks 412, 430 by closing the shut off valve on the hot water outlet 416, 432 of the other tank. The temperature set point of the tank that is shut off by the shut off valve may be reduced to help conserve energy. In some cases, the controller(s) may switch which of the tanks 412, 430 is shut off by the shut off valve, sometimes in an effort to balance the load across the tanks 412 and 430 over time.

While not explicitly shown, it is contemplated that in some instances, the first water tank 412 may include a flue gas condensing heat exchanger. In some embodiments the flue gas exiting the second water tank 430 may be directed through the flue 442 and into a heat exchanger (not explicitly shown) in the first water tank 412. It is contemplated that the heat from the flue gas in flue 442 may be used in addition to or in place of the gas burner 424. If the flue gas heat exchanger is used in place of the gas burner 424, it is contemplated that the gas burner 424, combustion gas line 422, gas source 420, and flue 426 in the first water tank 412 may not be necessary. The reverse configuration may also be used.

Figure 6:
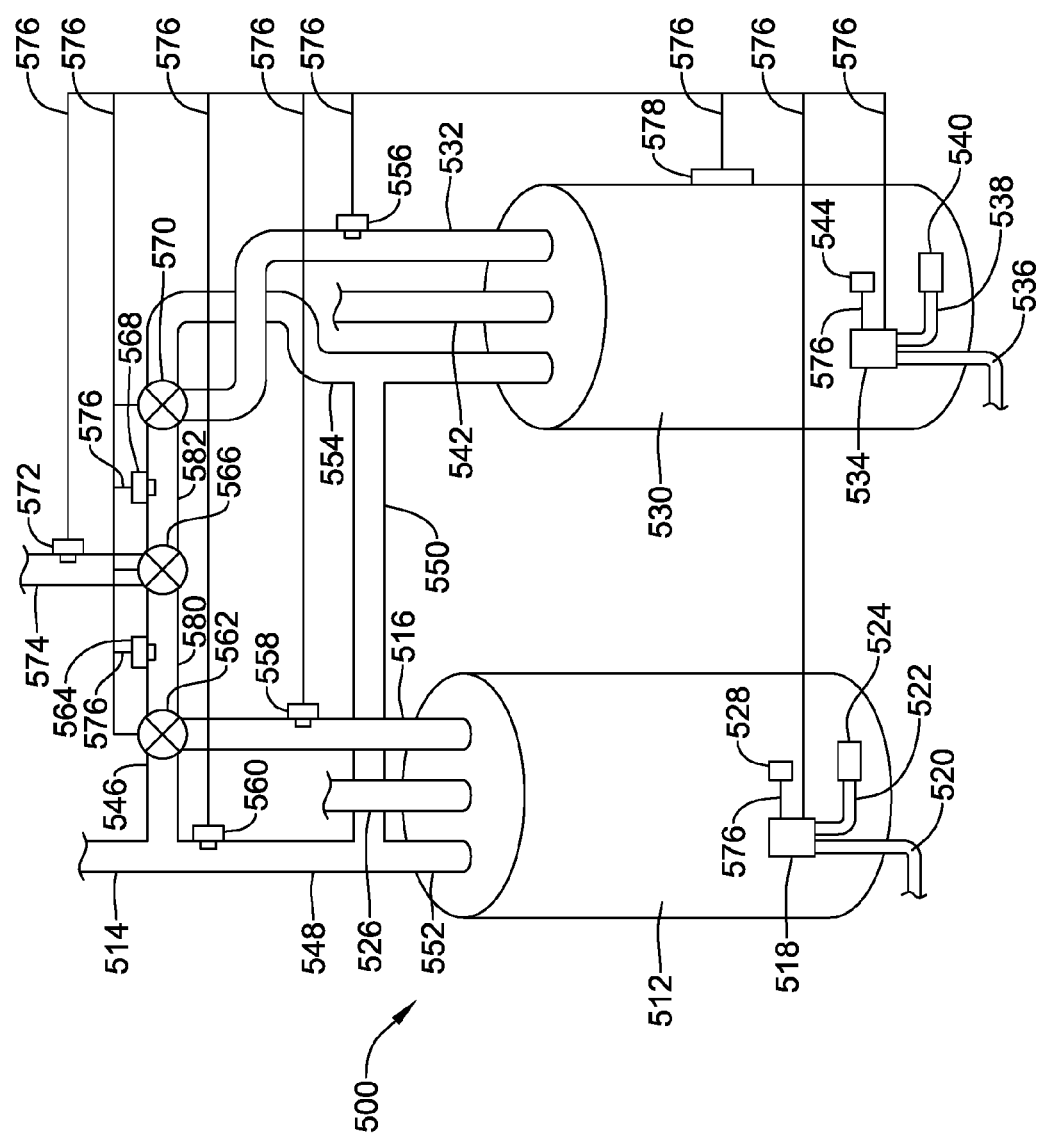
FIG. 6 is a schematic view of another illustrative but non-limiting water heater system.

FIG. 6 illustrates another exemplary water heater system 500. The water heater system 500 may include a first water tank 512 and a second water tank 530 plumbed in parallel with one another including multi-stage mixing valves. While the system 500 is illustrated as having two tanks 512, 530, it is contemplated that the system 500 may include any number of tanks desired, such as, but not limited to three, four, or more. In some embodiments, the first and second water tanks 512, 530 may be two smaller tanks (for example, the tanks 512, 530 may each be less than 60 gallons, less than 50 gallons, less than 40 gallons, less than 30 gallons, etc.). It is contemplated that the first water tank 512 and the second water tank 530 may have the same volume. However, this is not required. In some instances, the first water tank 512 may have a larger tank volume than the second water tank 530, or the second water tank 530 may have a larger tank volume than the first water tank 512. The first water tank 512 and second water tank 530 may be standard (e.g. non-condensing) atmospheric water tanks or any form of storage water tanks desired. In some instances, the first water tank 512 and the second water tank 530 may be physically separate structures as shown in FIG. 6. In other instances, the first water tank 512 and the second water tank 530 may be fluidly isolated volumes that are part of the same assembly. It is contemplated that, in some embodiments, one or both of the tanks 512, 530 may be tankless or instantaneous water heaters.

The first water tank 512 may include an insulating layer (not explicitly shown) positioned about the water tank 512 to help reduce thermal losses from the water tank 512. Cold water enters water tank 512 through a cold water line 514 and is heated by a gas burner 524. In some cases, the water tank 512 may include an electric heating element rather than a gas burner 524. When so provided, a power delivery unit (not shown) may be used to selectively apply power (i.e. current) to the electric heating element. For gas-fired water heaters, a control unit 518 may control a gas control unit, such as a gas valve, to regulate gas flow from a gas source 520 through a combustion gas line 522 and into gas burner 524. In some instances, control unit 518 may also control additional components of the water heater system. A flue 526 permits combustion byproducts to safely exit. Whether oil, gas or electric powered, the resulting heated water exits through a hot water line 516.

Similarly, the second water tank 530 may include an insulating layer (not explicitly shown) positioned about the water tank 530 to help reduce thermal losses from the water tank 512. Cold water may enter the second water tank 530 through a cold water line 550 branched off of a cold water line 514 and is heated by a gas burner 540. In some instances, cold water may be supplied to the second water tank 530 through a separate cold water supply. In some cases, the water tank 530 may include an electric heating element rather than a gas burner 540. When so provided, a power delivery unit (not shown) may be used to selectively apply power (i.e. current) to the electric heating element. For gas-fired water heaters, a control unit 534 may control a gas control unit, such as a gas valve, to regulate gas flow from a gas source 536 through a combustion gas line 538 and into gas burner 544. In some instances, control unit 534 may also control additional components of the water heater system. A flue 542 permits combustion byproducts to safely exit. Whether oil, gas or electric powered, the resulting heated water exits through a hot water line 432.

The first water tank 512 may include a temperature sensor 528, and the second water tank 530 may include a temperature sensor 544. Both the first water tank 512 and the second water tank 530 may be hooked up to a cold water line 514 for receiving cold water from a source. In some instances, the cold water line 514 may include a branch line 546 directly connected to an electronically controlled mixing valve 562 for injecting some cold water into the mixing valve 562, as will be discussed in more detail below, while some cold water passes through another portion of the line 548 and enters the first water tank 512 through the cold water inlet 552. In some embodiments, the cold water line 514 may also include a second cold water branch line 550 for delivering cold water to the second water tank 530. In other embodiments, a separate cold water supply line may be used to deliver water to the second water tank 530 and/or a separate cold water supply line may be used to deliver water to the mixing valve 562. The first gas burner 524 may heat the cold water entering the first water tank 512 to a first predetermined temperature setpoint, and the second gas burner 540 may heat the cold water entering the second water tank 530 to a second predetermined temperature setpoint. In some embodiments, the first and second temperature setpoints may be equal or approximately equal; however, this is not required. It is contemplated that the temperature setpoint of the first and second water tanks 512, 530 may be equal to or greater than the desired water temperature at the water outlet 574. In some cases, the first and second temperature setpoints may be different.

Heated water may exit the first water tank 512 through hot water line 516. Cold water may be injected into the hot water line 516 at an electronically controlled mixing valve 562. As noted above, the temperature of the hot water exiting the first water tank 512 may be hotter than the desired outlet 574 water temperature and thus the cold water may be used to temper, or cool, the hot water leaving the tanks. While the system as shown as having a branch cold water line 446, it is contemplated that a separate cold water line may be connected to the mixing valve 562. The tempered water may flow through an intermediate water line 580 to a secondary electronically controlled mixing valve 566. The secondary mixing valve 566 may mix tempered water from the first mixing valve 562 with tempered water from a second electronically controlled mixing valve 570.

Heated water may exit the second water tank 530 through hot water line 532. Cold water may be injected into the hot water line 532 at an electronically controlled mixing valve 570. In some embodiments, cold water may be delivered to the mixing valve 570 through a cold water line 554 branching off of cold water line 550. In other embodiments, cold water may be delivered to the mixing valve 570 through a separate cold water supply line. As noted above, the temperature of the hot water exiting the second water tank 530 may be hotter than the desired outlet 574 water temperature and thus the cold water may be used to temper, or cool, the hot water leaving the tanks. The tempered water may flow through an intermediate water line 582 to the secondary mixing valve 566. The secondary mixing valve 566 may control the proportion of water entering from intermediate line 580 to the water entering from intermediate line 582 to achieve a desired temperature at the water outlet 574 based on the temperature of the water in each intermediate line 580, 582. In some instances, the water temperature in intermediate line 580 may be greater than, less than, or equal to the desired water temperature at the outlet 574. The water temperature in intermediate line 582 may also be greater than, less than, or equal to the desired water temperature at the outlet 574. It is contemplated that if the temperature of the water in either intermediate line 580, 582 is less than the desired water temperature at the outlet 574, the water temperature in the other line 580, 582 may be greater than the desired water temperature at the outlet 574 in order to achieve the desired water temperature at the outlet 574.

It is contemplated that the water temperature exiting the water outlet 574 and the water temperature in the first and second water tanks 512, 530 may be selected to be any value desired based on the particular application. The operating setpoint of the water tanks 512, 530 may be selected based on a number of variables, such as, but not limited to, the temperature of the cold water entering the first and second water tank s 512, 530, the temperature of the cold water entering the second water tank 512 and the mixing valve 570, the desired water temperature at the water outlet 574, the volume of the water tanks 512, 530 and/or the percent of usable hot water in the water tanks 512, 530, etc. The proportion of cold water entering mixing valves 562, 570 to the hot water entering mixing valves 562, 570 from the tanks 512, 530 may also be dependent on a number of variables, such as, but not limited to, the temperature of the cold water entering the mixing valves 562, 570, the temperature of the hot water entering the mixing valves 562, 570, the desired water temperature at the water outlet 574, etc. It is further contemplated that the proportion of water entering the secondary mixing valve 566 from intermediate line 580 to the water entering the secondary mixing valve 566 from intermediate water line 582 may also be dependent upon a number of variables, such as, but not limited to, the temperature of the water in intermediate lines 580, 582 and the desired water temperature at the water outlet 574, etc.

The mixed water outlet 574 may include an outlet water temperature sensor 572 for measuring the temperature of the water exiting the water heater system 500. Intermediate water line 580 may also include a temperature sensor 564 for measuring the temperature of the water exiting the first mixing valve 562. Intermediate water line 582 may also include a temperature sensor 568 for measuring the temperature of the water exiting the second mixing valve 570. In some embodiments, a temperature sensor 556 may be provided in hot water line 532, a temperature sensor 560 may be provided in cold water line 548, and a temperature sensor 558 may be provided in hot water line 516 to improve control of the water temperature exiting the water heater system 500 at the outlet line 574, although this is not required. It is contemplated that the mixing valves 562, 566, 570, the outlet water temperature sensor 572, and the intermediate temperature sensors 564, 568 may be connected to the control units 518, 534 via a communication bus 576, or other alternative connection. For example, it is contemplated that the mixing valves 562, 566, 570 and temperature sensors 564, 568, 572 may be in wired or wireless communication with the control units 518, 534. Similarly, temperature sensors 528, 544, 556, 560, 558 may also be in communication with the control units 518, 534 via a communication bus 576 or other alternative connection. It is contemplated that the temperature sensors 528, 544, 556, 558, 560 may be in wired or wireless communication with the control units 518, 534. The water heater system 500 may include an optional Man-Machine Interface (MMI) or user interface 578. The user interface 578 may allow a user to view and/or modify temperature setpoints and other control features.

In some instances, the gas burner 524 on the first water tank 512 may be controlled by the first control unit 518 and the gas burner 540 on the second water tank 530 may be controlled by the second control unit 534. Control unit 518 and control unit 534 may be in either wired or wireless communication with one another to facilitate optimum control of the entire water heater system 500. In such an arrangement, for example, one control may act as master and the other as slave. This communication may allow for sharing of water temperature, safety status, water temperature stacking, etc. If a master/slave protocol is established, the master may be allowed to increase or decrease the temperature setpoint(s) of itself and the slave controls. In some instances, the master control may also be allowed to lockout any of the controls, depending on the safety status that was communicated to the master. It is also contemplated that a single overall control module (not explicitly shown) might be used for both tanks 512, 530, especially if both tanks 512, 530 are part of the same assembly (not explicitly shown).

Referring briefly to FIG. 8, it will be appreciated that control units 518, 534 may include controllers. FIG. 8 is a block diagram of such a controller 700. The controller 700 may be considered as being a portion of control units 518, 534, or separate from control units 518, 534. Controller 700 may have several modules. In some cases, controller 700 may have an INPUT/OUTPUT block 710 that accepts signals from the temperature sensors 528, 544, 556, 558, 560, 572 (FIG. 6). If water heater system 500 is in communication with an external thermostat or other controller, INPUT/OUTPUT block 710 may accommodate externally-derived control signals, and/or provide status and/or other information, as desired. In some cases, INPUT/OUTPUT block 710 may also provide appropriate output command signals to an electrically controlled gas valve (not illustrated) within control units 518, 534, or other electrically controlled valve, such as mixing valves 562, 566, 570.

In some instances, controller may include a microprocessor 720 that may be configured to accept appropriate signals from INPUT/OUTPUT block 710, and to determine appropriate output signals that can be outputted via INPUT/OUTPUT block 710, such as to other components within control units 518, 534 (FIG. 6) and/or to an external thermostat or other controller. Microprocessor 720 may be programmed to accept a temperature signal from temperature sensors 528, 544, 556, 558, 560, 572 (FIG. 6), and to calculate or otherwise determine a command temperature that alters the temperature value received from the temperature sensors 528, 544, 556, 558, 560, 572 in order to account or compensate for temperature differentials and/or thermal lag caused by the partial thermal isolation (if present) of the temperature sensors 528, 544, 556, 558, 560, 572 from the water in the water tanks 512, 530 or water lines 516, 532, 548, 574, 580, 582. The microprocessor 720 may be also be programmed to determine a command temperature based on the current or expected hot water demand on the water heater system 500. While not explicitly illustrated, microprocessor 720 may also include memory and/or other components.

It is contemplated that one or both of the control units 518, 534 may include a control algorithm for operating the mixing valves 562, 570 based on the desired water temperature at the water outlet 574. For example, the control units 518, 534 may include a controller configured to provide signals to the mixing valves 562, 570 via communication line 576 to change the ratio of hot water to cold water based on feedback received from the user interface 578, the intermediate water temperature sensors 564, 568, the cold water temperature sensor 560, and/or the hot water temperature sensors 556, 558. While the mixing valves 562, 570 have been described as electronically controllable mixing valves, it is contemplated that the mixing valves 562, 570 may be a non-electronically controlled mixing valve. The control units 518, 534 may also include a controller configured to provide signals to the secondary mixing valve 566 via communication line 576 to change the ratio of tempered water from line 580 to tempered water from line 582 based on feedback received from the user interface 578, the outlet water temperature sensor 572, and/or the intermediate water temperature sensors 564, 568. While the mixing valve 566 has been described as an electronically controllable mixing valve, it is contemplated that the mixing valve 566 may be a non-electronically controlled mixing valve.

The hot water capacity may depend on the temperature setpoint of the water within the water tanks 512, 530, the temperature of the cold water entering the first and second water tanks 512, 530, the temperature of the water exiting the first water tank 512 through the water line 516, the temperature of the water exiting the second water tank 530 through the water line 532 and the desired temperature of the water exiting the water outlet 574.

It is contemplated that during use of the water heater system 500, hot water may be drawn from both the first and second water tanks 512, 530 evenly. However, this is not required. While not explicitly shown, in some instances one or both of the hot water lines 516, 532 may include an electronically controlled shut off valve. If the predicted hot water demand for a given time period is less than the volume of one of tanks 512, 530, water may be drawn from only one of the first or second tanks 512, 530 by closing a shut off valve on one of the hot water outlets.

While not explicitly shown, it is further contemplated that in some instances, the first water tank 512 may include a flue gas condensing heat exchanger. In some embodiments, the flue gas exiting the second water tank 530 may be directed through the flue 542 and into a heat exchanger (not explicitly shown) in the first water tank 512. It is contemplated that the heat from the flue gas in flue 542 may be used in addition to or in place of the gas burner 524. If the flue gas heat exchanger is used in place of the gas burner 524, it is contemplated that the gas burner 524, combustion gas line 522, gas source 520, and flue 526 in the first water tank 512 may not be necessary. The reverse configuration may also be used.

Referring to FIGS. 4-6, in some instances, the water heater system 300, 400, 500 may use the relationship between hot water usage and the time of day to determine the most efficient way to heat the first and second tanks. The relationship between hot water usage and the time of day may be entered into the user interface 362, 466, 578, if so provided, directly by a user. In other embodiments, the controllers 318, 334, 418, 434, 518, 534 may utilize an algorithm that monitors hot water usage to develop a schedule of expected hot water demand. For systems without a water flow rate sensor, the controller(s) 318, 334, 418, 434, 518, 534 may indirectly estimate hot water usage by monitoring the water temperature and call-for-heat signals. For systems with a water flow rate sensor, the controller(s) 318, 334, 418, 434, 518, 534 may use that signal to directly measure the hot water usage.

For water heaters with an integrated controller, the controllers may communicate as master/slaves, as discussed above, or via another communication protocol to adjust the temperature setpoint of each water tank 312, 330, 412, 430, 512, 530. For water heater systems without an integrated controller, a single controller may be used to individually control the temperature of the other water tanks. Based on the configuration of the water heaters (series/parallel), the required hot-water capacity at that time of day, and whether there are any mixing or shutoff valves at the water heater outlets, the temperature setpoints of each of the water tanks 312, 330, 412, 430, 512, 530 may be optimized such that the water tanks 312, 330, 412, 430, 512, 530 as a group could meet the immediate hot-water demand of the user.

In one example, a system including two tanks in parallel, such as tanks 312, 330, tanks 412, 430, or tanks 512, 530, the first tank 312, 412, 512 and the second tank 330, 430, 530 each receive cold water with a first temperature T1 and heats the water to a second temperature T2. It is contemplated that T2 may be greater than or equal to the desired water temperature at the outlet 360, 472, 574. For illustrative purposes only, the first and second tanks 312, 412, 512, 330, 430, 530 may each have a volume of 30 gallons. However, this is merely exemplary and is not intended the limit or define the volume of the tanks. The tanks 312, 412, 512, 330, 430, 530 may have any volume desired. If the predicted hot water demand for the user at a given time is 10 gallons, the master control may reduce the temperature setpoint of the first tank 312, 412, 512 to T1 such that the burner is not used to heat the water. A shutoff valve on the hot water outlet 316, 416, 516 of the first tank 312, 412, 512 may be shut such that water from the first tank 312, 412, 512 does not leave the tank. While separate shutoff valves are not shown in FIGS. 4-6, mixing valves 458 and 562 may be used for this purpose, if desired. The temperature setpoint of the second tank 330, 430, 530 may be left at a temperature that would provide 10 gallons of water at the desired water temperature at the outlet 360, 472, 574. It is contemplated that if the temperature setpoint of the second tank 330, 430, 530 is greater than the desired water temperature at the outlet 360, 472, 574, then less than 10 gallons of heated water may be drawn from the second tank 330, 430, 530. Such a control algorithm may prevent the burner 324, 424, 524 on the first tank 312, 412, 512 from heating the water in the first tank 312, 412, 512 unnecessarily. It is contemplated that the reverse configuration may also be used.

If the predicted hot water demand for the user at this time is 45 gallons, the master control may change the temperature setpoint of the first tank 312, 412, 512 to T2 and leave the temperature setpoint of the second tank 330, 430, 530 at T2. This may allow the system 300, 400, 500 to provide more than 30 gallons of water.

Figure 7A:
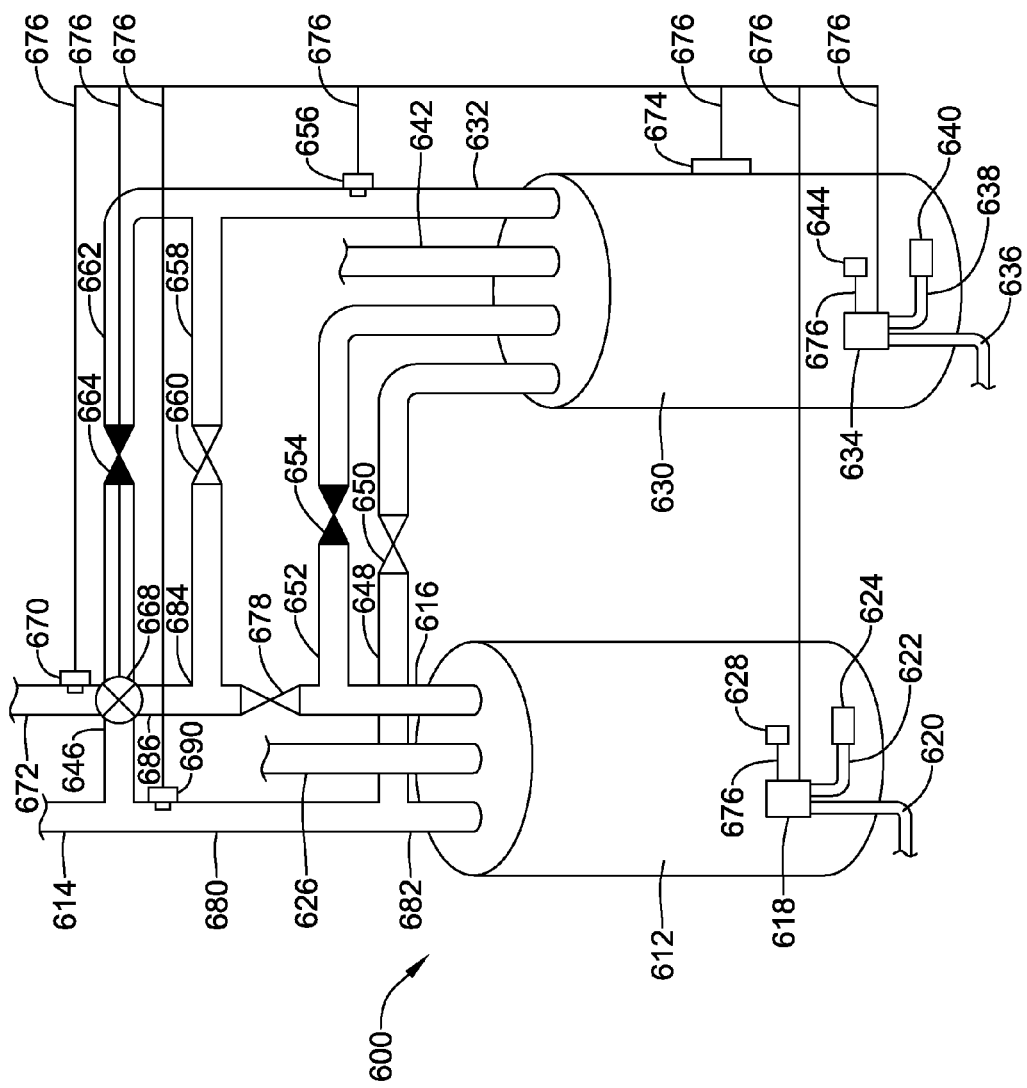
FIG. 7A is a schematic view of an illustrative but non-limiting water heater system.
Figure 7B:
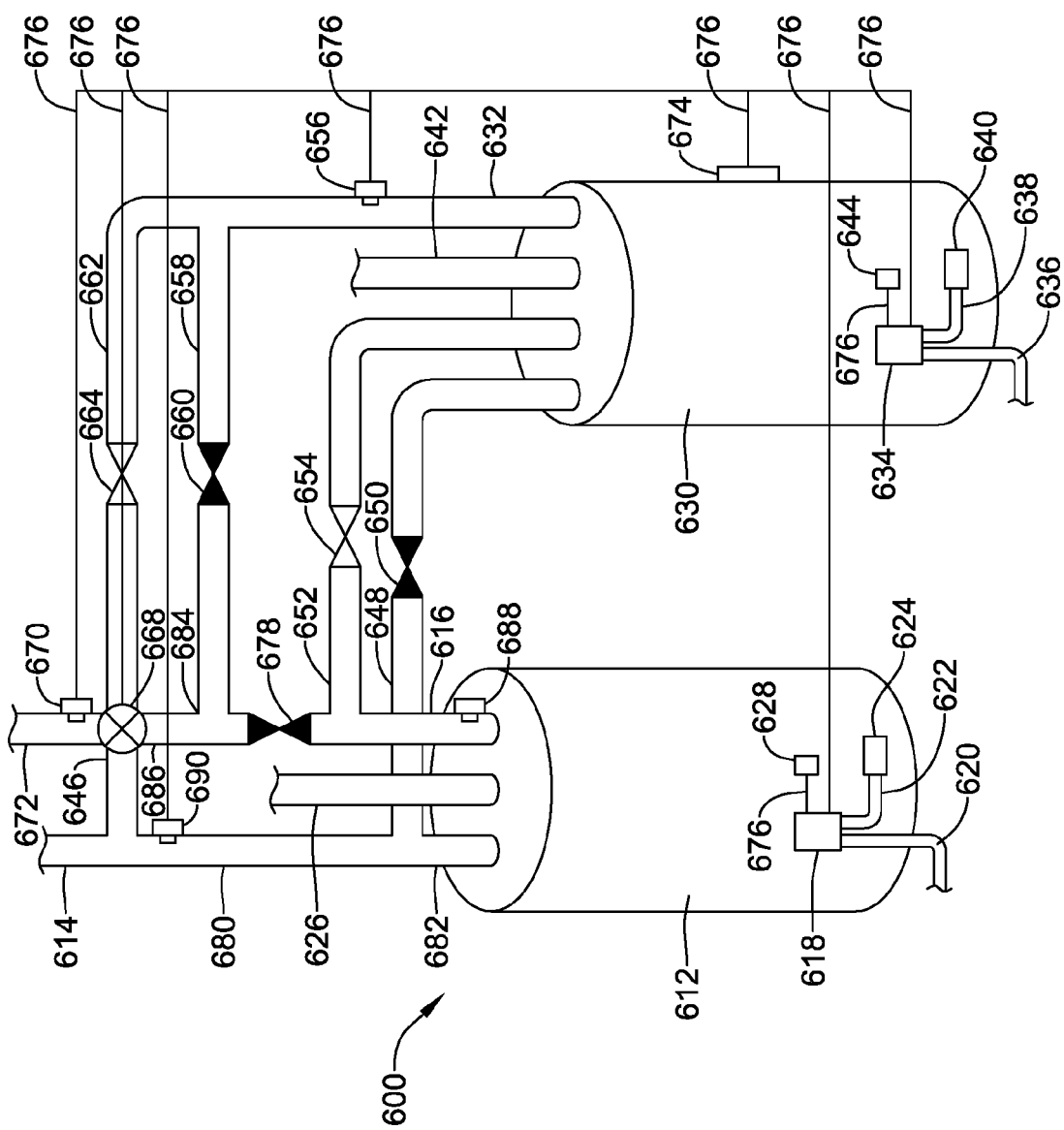
FIG. 7B is a schematic view of alternative to the illustrative but non-limiting water heater system of FIG. 7A.

FIGS. 7A and 7B illustrate another exemplary water heater system 600. The water heater system 600 may include a first water tank 612 and a second water tank 630. The first and second water tanks 612, 630 may be plumbed to switch between a parallel configuration, as shown 7A, and a series configuration, as shown in FIG. 7B. While the system 600 is illustrated as having two tanks 612, 630, it is contemplated that the system 600 may include any number of tanks desired, such as, but not limited to three, four, or more. In some embodiments, the first and second water tanks 612, 630 may be two smaller tanks (for example, the tanks 612, 630 may each be less than 60 gallons, less than 50 gallons, less than 40 gallons, less than 30 gallons, etc.). It is contemplated that the first water tank 612 and the second water tank 630 may have the same volume. However, this is not required. In some instances, the first water tank 612 may have a larger tank volume than the second water tank 630 or the second water tank 630 may have a larger tank volume than the first water tank 612. The first water tank 612 and second water tank 630 may be standard (e.g. non-condensing) atmospheric water tanks or any form of storage water tanks desired. In some instances, the first water tank 612 and the second water tank 630 may be physically separate structures as shown in FIGS. 7A and 7B. In other instances, the first water tank 612 and the second water tank 630 may be fluidly isolated volumes that are part of the same assembly. It is contemplated that, in some embodiments, one or both of the tanks 612, 630 may be tankless or instantaneous water heaters.

The first water tank 612 may include an insulating layer (not explicitly shown) positioned about the water tank 612 to help reduce thermal losses from the water tank 612. Cold water enters water tank 612 through a cold water line 614 and is heated by a gas burner 624. In some cases, the water tank 612 may include an electric heating element rather than a gas burner 624. When so provided, a power delivery unit (not shown) may be used to selectively apply power (i.e. current) to the electric heating element. In either case, the resulting heated water exits through a water outlet line 616. The water outlet 616 may include a shutoff valve 678 for switching between a parallel and a series configuration, as will be discussed in more detail below. For gas-fired water heaters, a control unit 618 may control a gas control unit, such as a gas valve, to regulate gas flow from a gas source 620 through a combustion gas line 622 and into gas burner 624. In some instances, control unit 618 may also control additional components of the water heater system. A flue 626 permits combustion byproducts to safely exit. Whether oil, gas or electric powered, the resulting heated water exits through a hot water line 616.

Similarly, the second water tank 630 may include an insulating layer (not explicitly shown) positioned about the water tank 630 to help reduce thermal losses from the water tank 612. When the water heater system 600 is operated with the tanks in parallel, cold water may enter the second water tank 630 through a cold water line 648 branched off of a cold water line 614 and is heated by a gas burner 640. In some instances, cold water may be supplied to the second water tank 630 through a separate cold water supply. When the water heater system 600 is operated in series, warm and/or hot water may enter the second water tank 630 from the first water tank 612 through a branch water line 652 off of hot water outlet 616 and is heated by a gas burner 640. The cold water line 648 and the warm/hot water line 652 may each be provided with a shutoff valve 650, 654 to allow the system to be operated in either a parallel configuration or a series configuration as desired, as will be discussed in more detail below. In some cases, the water tank 630 may include an electric heating element rather than a gas burner 640. When so provided, a power delivery unit (not shown) may be used to selectively apply power (i.e. current) to the electric heating element. The hot water line 632 may include two branch lines 658, 662 each having a shutoff valve 660, 664 for switching between a parallel and a series configuration, as will be discussed in more detail below. For gas-fired water heaters, a control unit 634 may control a gas control unit, such as a gas valve, to regulate gas flow from a gas source 636 through a combustion gas line 638 and into gas burner 640. In some instances, control unit 634 may also control additional components of the water heater system. A flue 642 permits combustion byproducts to safely exit. Whether oil, gas or electric powered, the resulting heated water exits through a hot water line 632. The first water tank 612 may include a temperature sensor 628 and the second water tank 630 may include a temperature sensor 644.

It is contemplated that the water heater system 600 may be operated in either a parallel configuration or a series configuration, depending on the current conditions. The system 600 may switch between configurations by actuating one or more shutoff valves, as will be described herein. Referring specifically to FIG. 7A, in the parallel configuration, both the first water tank 612 and the second water tank 630 may be configured to receive cold water from a source through cold water line 614. In some instances, the cold water line 614 may include a branch line 646 directly connected to an electronically controlled mixing valve 668 for injecting some cold water into the mixing valve 668, as will be discussed in more detail below, while some cold water passes through another portion of the line 680 and enters the first water tank 612 through the cold water inlet 682. In some embodiments, the cold water line 614 may also include a second branch cold water line 648 for delivering cold water to the second water tank 630. In other embodiments, a separate cold water supply line may be used to deliver water to the second water tank 630. As noted above, branch cold water line 648 may be provided with a shutoff valve 650. When the first and second tanks 612, 630 are operated in a parallel configuration, it may be desirable to have cold water entering both the first and second tanks 612, 630 simultaneously. In the parallel configuration, valve 650 may be in the open position (not shaded in FIG. 7A) to allow cold water to flow into the second tank 630. Valve 654 in outlet line 652 may be closed (shaded in FIG. 7A), thus preventing the warm and/or hot water exiting the first tank 612 from entering the second tank 630. The first gas burner 624 may heat the cold water entering the first water tank 612 to a first predetermined temperature setpoint and the second gas burner 640 may heat the cold water entering the second water tank 630 to a second predetermined temperature setpoint. In some embodiments, the first and second temperature setpoints may be equal or approximately equal; however, this is not required. It is contemplated that the temperature setpoint of the first and second water tanks 612, 630 may be equal to or greater than the desired water temperature at the water outlet 672. In some cases, the first and second temperature setpoints may be different.

Still referring to FIG. 7A, heated water may exit the first water tank 612 through hot water line 616. Hot water line 616 may include a shutoff valve 678 that may be in the open position to allow hot water to enter an electronically controlled mixing valve 668. Heated water may also exit the second water tank 630 through hot water line 632. As noted above, the hot water line 632 may include two branch lines 658, 662. The first branch line 658 may include a shutoff valve 660 and may join hot water line 616 at intersection 684. The second branch line 662 may include a shutoff valve 664 and may direct water to the mixing valve 668. In the parallel configuration, the valve 660 in the first branch line 658 may be open while the valve 664 in the second branch line 662 may be closed. This may direct the hot water from the second tank 630 to mix with the hot water from the first tank 612 at an intersection 684. The hot water from lines 658 and 616 may mix and be delivered to an electronically controlled mixing valve 668 via hot water line 686. Cold water may be injected into the hot water line 686 at the electronically controlled mixing valve 668. As noted above, the temperature of the hot water exiting the first and second water tanks 612, 630 may be hotter than the desired outlet 672 water temperature and thus the cold water may be used to temper, or cool, the hot water leaving the tanks. While the system as shown as having a branch cold water line 646, it is contemplated that a separate cold water line may be connected to the mixing valve 668. Water at the desired temperature may exit the system 600 at the water outlet 672.

Referring now to FIG. 7B, in the series configuration, the first water tank 612 may be hooked up to a cold water line 614 for receiving cold water from a source. In some instances, the cold water line 614 may include a branch line 646 directly connected to an electronically controlled mixing valve 668 for injecting some cold water into the mixing valve 668, as will be discussed in more detail below, while some cold water passes through another portion of the line 680 and enters the first water tank 612 through the cold water inlet 682 into the first tank 612. In some embodiments, the cold water line 614 may also include a second branch cold water line 648 for delivering cold water to the second water tank 630. As noted above, the branch cold water line 648 may be provided with a shutoff valve 650. When the system is operated in a series configuration, valve 650 may be closed (shaded in FIG. 7B) to prevent cold water from entering the second water tank 630.

The gas burner 624 may heat the cold water entering the first water tank 612 to a first predetermined temperature setpoint. It is contemplated that the temperature setpoint of first water tank 612 may be greater than the temperature of the cold water entering the first water tank 612 but less than the desired output temperature of the water heater system 600 at the mixed water outlet line 672. The heated water may exit the first water tank 612 through the water outlet line 616. As noted above, water outlet 616 may include a branch line 652 having a shutoff valve 654 for directing warm/hot water to the second water tank 630. In the series configuration, valve 654 may be open (not shaded in FIG. 7B) while valve 678 in the water outlet line 616 is closed (shaded in FIG. 7B) to allow warm water to pass into the second water tank 630.

Still referring to FIG. 7B, the gas burner 640 may heat the water entering the second water tank 630 to a second predetermined temperature setpoint. It is contemplated that the second predetermined temperature setpoint may be greater than the first predetermined temperature setpoint of the first water tank 612. In some instances, the second predetermined temperature setpoint may be the desired hot water setpoint for the water heater system 600. In other instances, the second predetermined temperature setpoint may be higher than the desired water temperature exiting the water heater system 600 at the mixed water outlet line 672. It is contemplated that by maintaining the water temperature of the first water tank 612 at a lower temperature, the water heater system 600 standby losses and the overall water heater system 600 efficiency rating may be improved.

Heated water may exit the second water tank 630 through hot water line 632. As noted above, the hot water line 632 may include two branch lines 658, 662. The first branch line 658 may include a shutoff valve 660 and may join hot water line at intersection 684. The second branch line 662 may include a shutoff valve 664 and may direct water directly to the mixing valve 668. In the series configuration, the valve 660 in the first branch line 658 may be closed while the valve 664 in the second branch line 662 may be open. This may direct the hot water from the second tank 630 to the electronically controlled mixing valve 668 via hot water line 662. Cold water may be injected into the hot water line 662 at the electronically controlled mixing valve 668. As noted above, the temperature of the hot water exiting the second water tank 630 may be hotter than the desired outlet 672 water temperature and thus the cold water may be used to temper, or cool, the hot water leaving the tanks. While the system as shown as having a branch cold water line 646, it is contemplated that a separate cold water line may be connected to the mixing valve 668. Water at the desired temperature may exit the system 600 at the water outlet 672.

Regardless of the configuration of the tanks (e.g. parallel or series), it is contemplated that the water temperature exiting the water outlet 672 and the water temperature in the first and second water tanks 612, 630 may be selected to be any value desired based on the particular application. The operating setpoint of the water temperature within the water tanks 612, 630 may be selected based on a number of variables, such as, but not limited to, the temperature of the cold water entering the first and/or second water tanks 612, 630 and the mixing valve 668, the desired water temperature at the water outlet 672, the volume of the water tanks 612, 630 and/or the percent of usable hot water in the water tanks 612, 630, etc. The proportion of cold water entering the mixing valve 668 to the hot water entering the mixing valves 668 from either line 686 or line 662 may also be dependent on a number of variables, such as, but not limited to, the temperature of the cold water entering the mixing valve 668, the temperature of the hot water entering the mixing valve 668, the desired water temperature at the water outlet 672, etc.

The mixed water outlet 672 may include an outlet water temperature sensor 670 for measuring the temperature of the water exiting the water heater system 600. In some embodiments, a temperature sensor 656 may be provided in the hot water line 632, a temperature sensor 690 may be provided in the cold water line 680, and a temperature sensor 688 may be provided in hot water line 616 to improve control of the water temperature exiting the water heater system 600 at the outlet line 672, although this is not required. It is contemplated that the mixing valve 668 and the outlet water temperature sensor 670 may be connected to the control units 618, 634 via a communication bus 676, or other alternative connection. For example, it is contemplated that the mixing valve 668 and temperature sensors 656, 690, 670, 688 may be in wired or wireless communication with the control units 618, 634. Similarly, temperature sensors 628, 644, 656, 690, 688 may also be in communication with the control units 618, 634 via a communication bus 676 or other alternative connection. It is contemplated that the temperature sensors 628, 644, 656, 690, 688 may be in wired or wireless communication with the control units 618, 634. The water heater system 600 may include an optional Man-machine interface (MMI) or user interface 674. The user interface 674 may allow a user to view and/or modify temperature setpoints and other control features.

In some instances, the gas burner 624 on the first water tank 612 may be controlled by the first control unit 618 and the gas burner 640 on the second water tank 630 may be controlled by the second control unit 634. Control unit 618 and control unit 634 may be in either wired or wireless communication with one another to facilitate optimum control of the entire water heater system 600. In such an arrangement, for example, one control may act as master and the other as slave. This communication may allow for sharing of water temperature, safety status, water temperature stacking, etc. If a master/slave protocol is established, the master may be allowed to increase or decrease the temperature setpoint(s) of itself and the slave controls. In some instances, the master control may also be allowed to lockout any of the controls, depending on the safety status that was communicated to the master. It is also contemplated that a single overall control module (not explicitly shown) might be used for both tanks 612, 630, especially if both tanks 612, 630 are part of the same assembly (not explicitly shown).

Referring briefly to FIG. 8, it will be appreciated that control units 618, 634 may include controllers. FIG. 8 is a block diagram of such a controller 700. The controller 700 may be considered as being a portion of control unit 618, 634, or separate from control unit 618, 634. Controller 700 may have several blocks. In some cases, controller 700 may have an INPUT/OUTPUT block 710 that accepts signals from the temperature sensors 628, 644, 656, 690, 670, 688 (FIGS. 7A and 7B). If water heater system 600 is in communication with an external thermostat or other controller, INPUT/OUTPUT block 710 may accommodate externally-derived control signals, and/or provide status and/or other information, as desired. In some cases, INPUT/OUTPUT block 710 may also provide appropriate output command signals to an electrically controlled gas valve (not illustrated) within control units 618, 634, or other electrically controlled valve, such as mixing valve 668.

In some instances, controller may include a microprocessor 720 that may be configured to accept appropriate signals from INPUT/OUTPUT block 710, and to determine appropriate output signals that can be outputted via INPUT/OUTPUT block 710, such as to other components within control units 618, 634 (FIGS. 7A and 7B) and/or to an external thermostat or other controller. Microprocessor 720 may be programmed to accept a temperature signal from temperature sensors 628, 644, 656, 690, 670, 688 (FIGS. 7A and 7B), and to calculate or otherwise determine a command temperature that alters the temperature value received from the temperature sensors 628, 644, 656, 690, 670, 688 in order to account or compensate for temperature differentials and/or thermal lag caused by the partial thermal isolation (if present) of the temperature sensors 628, 644, 656, 690, 670, 688 from the water in the water tanks 612, 630 or water lines 616, 632, 680, 672, 616. The microprocessor 720 may be also be programmed to determine a command temperature based on the current or expected hot water demand on the water heater system 600. While not explicitly illustrated, microprocessor 720 may also include memory and/or other components.

It is contemplated that one or both of the control units 618, 634 may include a control algorithm for operating the mixing valve 668 based on the desired water temperature at the water outlet 672. For example, the control units 618, 634 may include a controller configured to provide signals to the mixing valve 668 via communication line 676 to change the ratio of hot water to cold water based on feedback received from the user interface 674, the outlet water temperature sensor 670, the cold water temperature sensor 690, and/or the hot water temperature sensors 656, 688. It is further contemplated that the controller may provide signals to electronically controlled shutoff valves 650, 654, 660, 664, 678 to open and close based on the desired operating configuration. The controller may also use a control algorithm to determine the appropriate temperature setpoints of the first and second tanks 612, 630 based on the configuration of the tanks 612, 630 (e.g. parallel or series). While the mixing valve 668 and shutoff valves 650, 654, 660, 664, 678 have been described as electronically controllable mixing valves, it is contemplated that the valves 668, 650, 654, 660, 664, 678 may be non-electronically controlled valves.

It is contemplated that any number of mixing valves may be used with any size of tank and with any number of tanks. For each tank the mixing valves are used with, the effective hot water capacity may be increased. The amount of increase in the hot water capacity may depend on the temperature setpoint of the water within the water tanks 612, 630, the temperature of the cold water entering the first and second water tanks 612, 630, the temperature of the water exiting the first water tank 612 through the water line 616, the temperature of the water exiting the second water tank 630 through the water line 632 and the desired temperature of the water exiting the water outlet 672.

While not explicitly shown, it is further contemplated that in some instances, the first water tank 612 may include a flue gas condensing heat exchanger. In some embodiments the flue gas exiting the second water tank 630 may be directed through the flue 642 and into a heat exchanger (not explicitly shown) in the first water tank 612. It is contemplated that the heat from the flue gas in flue 642 may be used in addition to or in place of the gas burner 624. If the flue gas heat exchanger is used in place of the gas burner 624, it is contemplated that the gas burner 624, combustion gas line 622, gas source 620, and flue 626 in the first water tank 612 may not be necessary. The reverse configuration may also be used.

Figure 9:
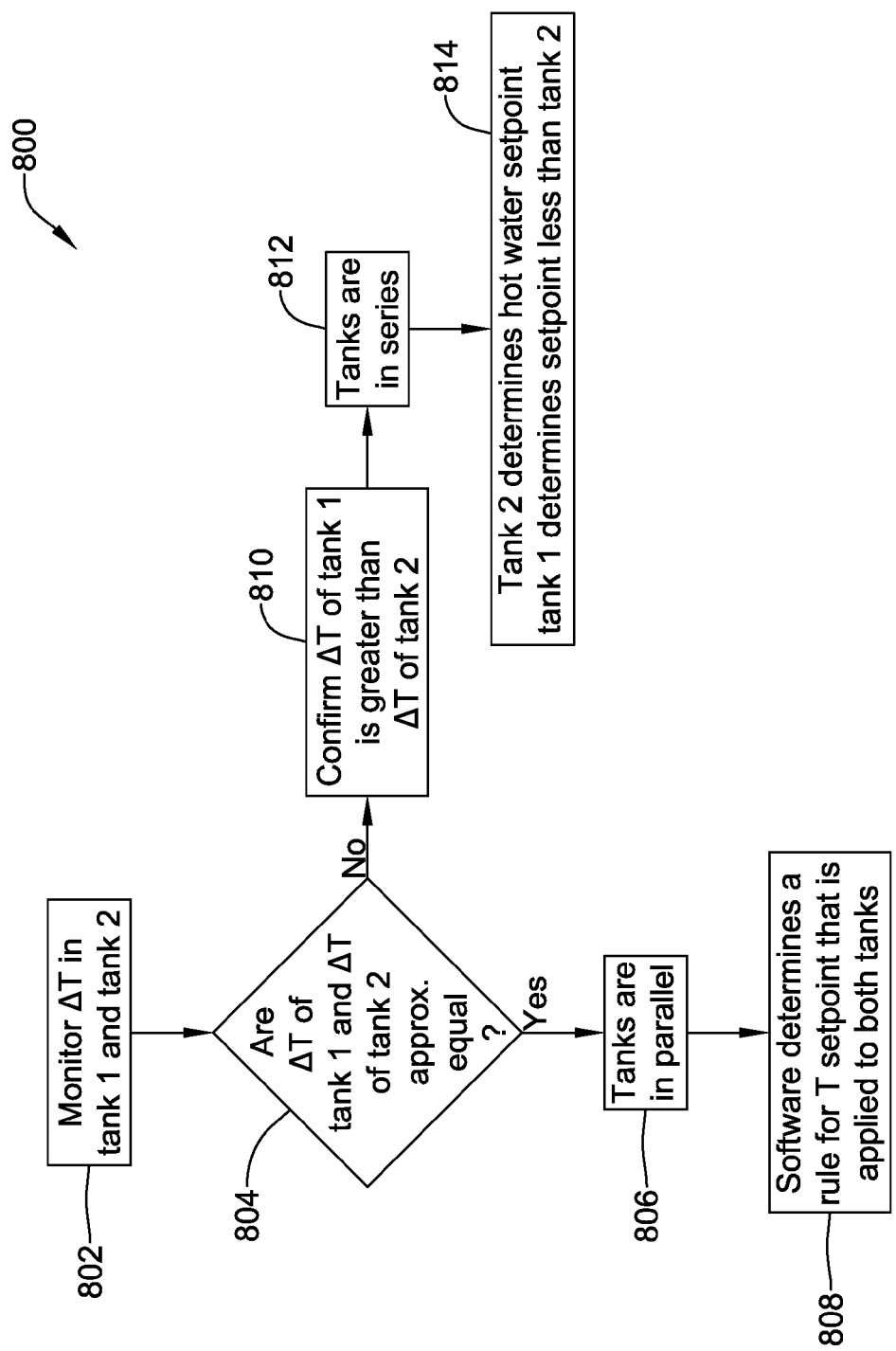
FIG. 9 is a method of determining how multiple water tanks are plumbed.

As water heater systems may be provided in a parallel tank configuration, a series tank configuration, or capable of switching between the two configurations, additional controls may be used to optimized how the water heaters function in these different scenarios. FIG. 9 illustrates a method 800 for determining whether two or more tanks are in series or parallel. As noted above, the illustrative water heater system may include controller having the necessarily hardware and software to receive feedback from the water heaters as well as to provide control signals to various components of the system. The controller may also be configured to analyzed data received from the water heater tanks to help optimize the performance of the system.

Using either wired or wireless communication between the individual water heat controls, the control software may compare how the water temperature on each tank behaves during water draw cycles. This may help the controller to determine if the tanks are plumbed in series or in parallel. For as system having two tanks (this is merely exemplary, it is contemplated that the system may have any number of tanks desired), the controller may monitor the changes in temperature (ΔT) in both the first and second tanks 802 during tank draws. The controller may then compare the changes in temperature for the first tank and the second tank to determine if they are approximately equal (or below a threshold amount) 804. Simultaneous removal of water from both tanks may cause cold water to enter the tanks at approximately the same rate causing the changes in temperature to be approximately equal. Thus, the controller determines the tanks are in parallel 806. The software may then determine a rule for the temperature setpoints of the first and second tanks 808. It is contemplated that there may be several different methods of configuring the temperature setpoints of the parallel tanks using the existing temperature setpoints. In one instance, the controller may apply the higher of two temperature setpoints to both tanks. In other instances, the controller may apply the lower of two temperature setpoints to both tanks. In yet another instance, the controller may average the two temperature setpoints and apply the average temperature setpoint to both tanks. These are merely examples. It is contemplated that once the control system has determined the tanks are in parallel any number of temperature setpoints may be applied to the tanks. For example, it is not required that both tanks have same temperature setpoint.

If the tanks are plumbed in series, the water temperature in the first tank would change much more than the water temperature in the second tank because cold water is replenishing the water drawn from the first tank, while warmer water is replenishing the water drawn from the second tank. Thus, if the tanks are plumbed in series, the changes in temperature for the first tank and the second tank are not approximately equal (e.g. greater than a threshold amount). Once the control software determines the changes in temperature for the first tank and the second tank are not approximately equal (e.g. greater than the threshold amount), the control software may verify the change in temperature of the first tank is greater than the temperature of the second tank 810. If the control software confirms the change in temperature of the first tank is greater than the temperature of the second tank, it is determined that the tanks are in series 812. It is contemplated that if change in temperature of the first tank is not greater than the change in temperature of the second tank and the changes in temperatures are not approximately equal, the water heater system may be incorrectly installed. The control unit may provide an alert indicating further system verification is necessary.

Once the control system determines the tanks are in series, the software may then determine a rule for the temperature setpoints of the first and second tanks 814. In some instances, the software may apply a setpoint to the second water tank that is greater to or equal to the desired output temperature. The setpoint of the first tank may be a lower temperature than the second tank to optimize the hot water capacity and balance the work load between the two tanks. It is contemplated that the control software may also take into consideration the presence or mixing valves or multi-stage mixing valves, such as the ones described herein, when determining the temperature setpoints for the tanks in either the parallel or series configuration.

In some cases, the controller may control a setpoint temperature of the first tank and a setpoint temperature of the second tank in accordance with a first control algorithm if the change in temperature in the first tank is different from the change in temperature in the second tank by at least the threshold amount, and may control the setpoint temperature of the first tank and the setpoint temperature of the second tank in accordance with a second control algorithm that is different from the first control algorithm if the change in temperature in the first tank is not different from the change in temperature in the second tank by at least the threshold amount.

The disclosure should not be considered limited to the particular examples described above, but rather should be understood to cover all aspects of the disclosure as set out in the attached claims. Various modifications, equivalent processes, as well as numerous structures to which the disclosure can be applicable will be readily apparent to those of skill in the art upon review of the instant disclosure.

What is claimed is:

1. A water heater system for providing heated water to a hot water supply line of a building that distributes the heated water throughout the building, the water heater system comprising:
   a first water storage tank having a first water inlet and a first water outlet, the first water storage tank controlled to a first setpoint temperature;
   a second water storage tank having a second water inlet and a second water outlet, the second water storage tank controlled to a second setpoint temperature;
   a water line fluidly connecting the first water outlet to the second water inlet for transporting water from the first water storage tank to the second water storage tank;
   a mixing valve having a first inlet fluidly coupled to the second water outlet downstream of the second water storage tank, the mixing valve being controllable via a communications interface;
   a cold water supply line in fluid communication with a second inlet of the mixing valve;
   a mixed water outlet fluidly coupled to an outlet of the mixing valve, the mixed water outlet configured to be plumbed to the hot water supply line of the building;
   a controller for controlling the mixing valve via the communications interface;
   wherein the controller is further configured to monitor hot water usage from the second water storage tank to develop a hot water usage schedule of expected hot water demand; and
   wherein the controller is further configured to adjust the first setpoint temperature of the first water storage tank in accordance with the hot water usage schedule.

2. The water heater system of claim 1, further comprising a temperature sensor positioned in the mixed water outlet and in communication with the controller.

3. The water heater system of claim 2, wherein the controller is configured to adjust a ratio of cold water entering the mixing valve from the cold water supply line to heated water entering the mixing valve from the second water outlet to achieve a desired temperature at the mixed water outlet.

4. The water heater system of claim 3, wherein the controller is configured to adjust the ratio of cold water entering the mixing valve from the cold water supply line to heated water entering the mixing valve from the second water outlet based on feedback received from the temperature sensor.

5. The water heater system of claim 1, wherein the first setpoint temperature of the first water storage tank is lower than the second setpoint temperature of the second water storage tank, and the second setpoint temperature of the second water storage tank is greater than a desired outlet water temperature of the water heater system.

6. The water heater system of claim 1, further comprising a temperature sensor positioned in the cold water supply line and in communication with the controller.

7. A water heater system for providing heated water to a hot water supply line of a building that distributes the heated water throughout the building, the water heater system comprising:
   a first water storage tank having a first water inlet and a first water outlet, the first water storage tank controlled to a first setpoint temperature;
   a second water storage tank having a second water inlet and a second water outlet, the second water storage tank controlled to a second setpoint temperature;
   a water line fluidly connecting the first water outlet to the second water inlet for transporting water from the first water storage tank to the second water storage tank;

a mixing valve having a first inlet fluidly coupled to the second water outlet downstream of the second water storage tank, the mixing valve being controllable via a communications interface;

a mixed water outlet fluidly coupled to an outlet of the mixing valve;

a controller for controlling the mixing valve via the communications interface; and wherein the controller is further configured to store a hot water usage schedule of expected hot water demand, and to adjust the first setpoint temperature of the first water storage tank in accordance with the hot water usage schedule.

8. The water heater system of claim 7, wherein the controller is further configured to adjust the second setpoint temperature of the second water storage tank in accordance with the hot water usage schedule.

9. The water heater system of claim 7, wherein the controller is configured to monitor a hot water usage of the water heater system to develop the hot water usage schedule.

10. The water heater system of claim 7, wherein the controller is configured to control a gas control unit of the first water storage tank in accordance with the first setpoint temperature.

11. The water heater system of claim 7, wherein the controller is configured to control a gas control unit of the second water storage tank in accordance with the second setpoint temperature.

12. The water heater system of claim 7, wherein the controller is configured to control a gas control unit of the first water storage tank in accordance with the first setpoint temperature, and to control a gas control unit of the second water storage tank in accordance with the second setpoint temperature.

13. The water heater system of claim 7, further comprising a temperature sensor positioned in the mixed water outlet and in communication with the controller, and wherein the controller adjusts a ratio of cold water entering the mixing valve from a cold water supply line to heated water entering the mixing valve from the second water outlet to achieve a desired temperature at the mixed water outlet.

14. A water heater system for providing heated water to a hot water supply line of a building that distributes the heated water throughout the building, the water heater system comprising:

a first water storage tank having a first water inlet and a first water outlet, the first water storage tank controlled to a first setpoint temperature;

a second water storage tank having a second water inlet and a second water outlet, the second water storage tank controlled to a second setpoint temperature;

a water line fluidly connecting the first water outlet to the second water inlet for transporting water from the first water storage tank to the second water storage tank;

a mixing valve having a first inlet fluidly coupled to the second water outlet downstream of the second water storage tank;

a mixed water outlet fluidly coupled to an outlet of the mixing valve;

a controller configured to store a hot water usage schedule of expected hot water demand, and to adjust the first setpoint temperature of the first water storage tank in accordance with the hot water usage schedule.

15. The water heater system of claim 14, wherein the controller is further configured to adjust the second setpoint temperature of the second water storage tank in accordance with the hot water usage schedule.

16. The water heater system of claim 14, wherein the controller is configured to monitor a hot water usage of the water heater system to develop the hot water usage schedule.

17. The water heater system of claim 14, wherein the controller is configured to control a gas control unit of the first water storage tank in accordance with the first setpoint temperature.

18. The water heater system of claim 14, wherein the controller is configured to control a gas control unit of the second water storage tank in accordance with the second setpoint temperature.

19. The water heater system of claim 14, wherein the controller is configured to control a gas control unit of the first water storage tank in accordance with the first setpoint temperature, and to control a gas control unit of the second water storage tank in accordance with the second setpoint temperature.

20. The water heater system of claim 14, wherein the controller is further configured to control the mixing valve to achieve a desired water temperature at the mixed water outlet.

* * * * *